(12) United States Patent
R et al.

(10) Patent No.: US 12,743,285 B1
(45) Date of Patent: Sep. 22, 2026

(54) PRESERVING BIOS CONFIGURATION DATA IN AN EMBEDDED COMPUTING DEVICE

(71) Applicant: AMERICAN MEGATRENDS INTERNATIONAL, LLC, Duluth, GA (US)

(72) Inventors: Ramesh R, Chennai (IN); Goutham Sayee Mullainathan, Chennai (IN); Janarthanam B, Chennai (IN); Sundar Rajan Pitchumani, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 43 days.

(21) Appl. No.: 18/926,240

(22) Filed: Oct. 24, 2024

(51) Int. Cl.
*G06F 9/44* (2018.01)
*G06F 9/4401* (2018.01)

(52) U.S. Cl.
CPC .................................. *G06F 9/4401* (2013.01)

(58) Field of Classification Search
CPC ................. G06F 1/32; G06F 1/12; G06F 9/44
See application file for complete search history.

(56) References Cited

U.S. PATENT DOCUMENTS

2018/0088963 A1* 3/2018 Arora .................... G06F 9/4406
2024/0220367 A1* 7/2024 Hiremath ............. G06F 9/4401

* cited by examiner

*Primary Examiner* — Keshab R Pandey
(74) *Attorney, Agent, or Firm* — Newport IP, LLC; Ryan Donoghue

(57) ABSTRACT

To address the challenge of preserving BIOS configuration data in an embedded computing device, the disclosed techniques utilize a non-volatile storage device comprising a dedicated configuration area for storing BIOS configuration data, such as a user's BIOS preference settings. BIOS configuration data is copied from a Main BIOS to the configuration area. When the Main BIOS becomes corrupted, it is replaced with a copy of a Golden BIOS, overwriting the Main BIOS configuration data with the default settings of the Golden BIOS. The embedded computing device can access the configuration area and read the copy of the Main BIOS configuration data to the Golden BIOS copy that is now acting as the operational BIOS. Implementation of the above features can achieve technical benefits such as, but not limited to, increased reliability and operational efficiency of the device in rugged application environments due to continued use of user-optimized settings.

18 Claims, 25 Drawing Sheets

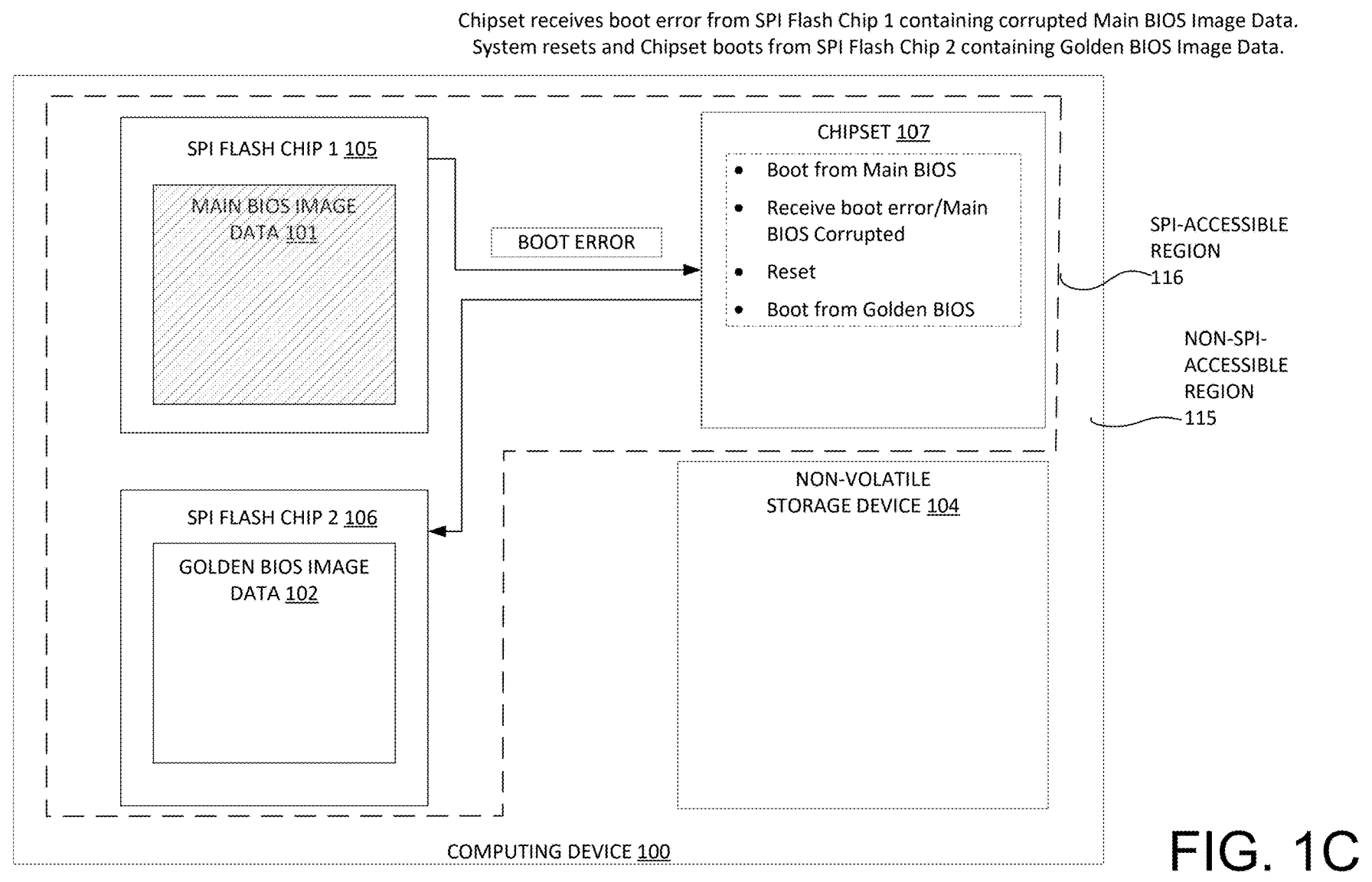

Chipset receives boot error from SPI Flash Chip 1 containing corrupted Main BIOS Image Data.
System resets and Chipset boots from SPI Flash Chip 2 containing Golden BIOS Image Data.

SPI FLASH CHIP 1 105

MAIN BIOS IMAGE DATA 101

BOOT ERROR

CHIPSET 107

- Boot from Main BIOS
- Receive boot error/Main BIOS Corrupted
- Reset
- Boot from Golden BIOS

SPI-ACCESSIBLE REGION 116

NON-SPI-ACCESSIBLE REGION 115

SPI FLASH CHIP 2 106

GOLDEN BIOS IMAGE DATA 102

NON-VOLATILE STORAGE DEVICE 104

COMPUTING DEVICE 100

FIG. 1C

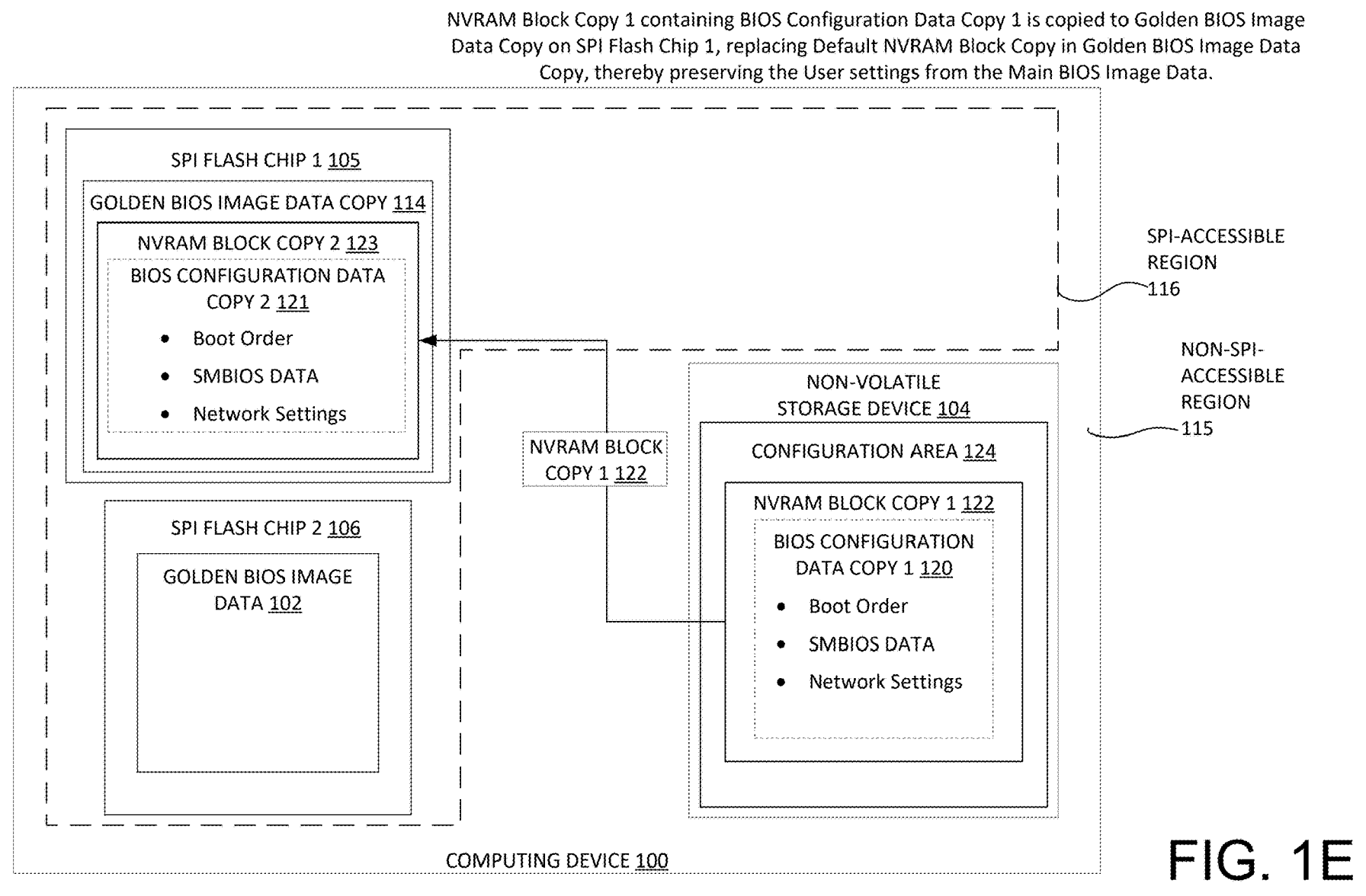

NVRAM Block Copy 1 containing BIOS Configuration Data Copy 1 is copied to Golden BIOS Image Data Copy on SPI Flash Chip 1, replacing Default NVRAM Block Copy in Golden BIOS Image Data Copy, thereby preserving the User settings from the Main BIOS Image Data.

SPI FLASH CHIP 1 105

GOLDEN BIOS IMAGE DATA COPY 114

NVRAM BLOCK COPY 2 123

BIOS CONFIGURATION DATA COPY 2 121

- Boot Order
- SMBIOS DATA
- Network Settings

SPI FLASH CHIP 2 106

GOLDEN BIOS IMAGE DATA 102

NVRAM BLOCK COPY 1 122

NON-VOLATILE STORAGE DEVICE 104

CONFIGURATION AREA 124

NVRAM BLOCK COPY 1 122

BIOS CONFIGURATION DATA COPY 1 120

- Boot Order
- SMBIOS DATA
- Network Settings

SPI-ACCESSIBLE REGION 116

NON-SPI-ACCESSIBLE REGION 115

COMPUTING DEVICE 100

FIG. 1E

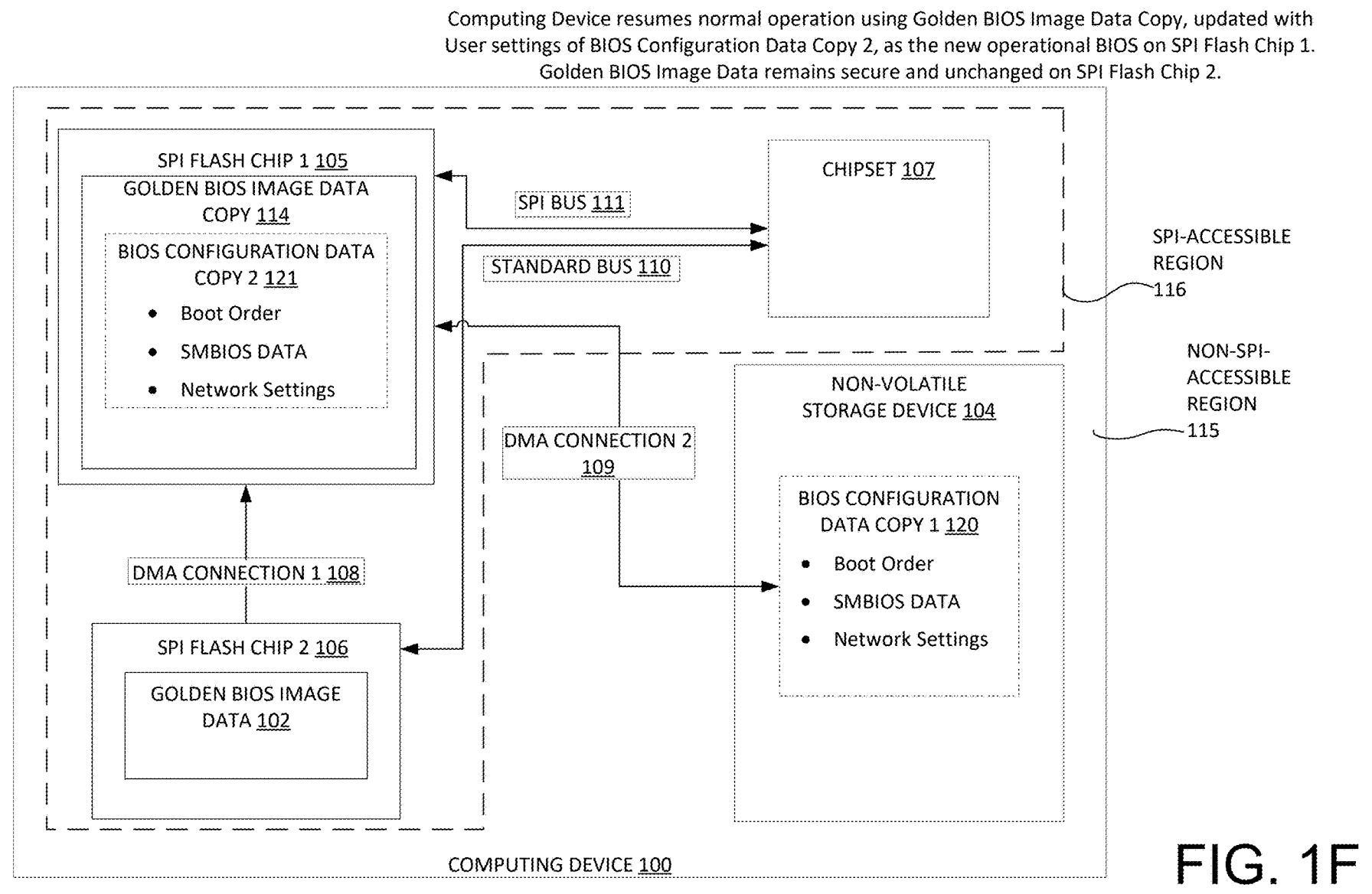

Computing Device resumes normal operation using Golden BIOS Image Data Copy, updated with User settings of BIOS Configuration Data Copy 2, as the new operational BIOS on SPI Flash Chip 1. Golden BIOS Image Data remains secure and unchanged on SPI Flash Chip 2.

SPI FLASH CHIP 1 105
GOLDEN BIOS IMAGE DATA COPY 114
BIOS CONFIGURATION DATA COPY 2 121
- Boot Order
- SMBIOS DATA
- Network Settings SPI BUS 111
STANDARD BUS 110
CHIPSET 107
SPI-ACCESSIBLE REGION 116
NON-SPI-ACCESSIBLE REGION 115
DMA CONNECTION 2 109
NON-VOLATILE STORAGE DEVICE 104
BIOS CONFIGURATION DATA COPY 1 120
- Boot Order
- SMBIOS DATA
- Network Settings DMA CONNECTION 1 108
SPI FLASH CHIP 2 106
GOLDEN BIOS IMAGE DATA 102
COMPUTING DEVICE 100

FIG. 1F

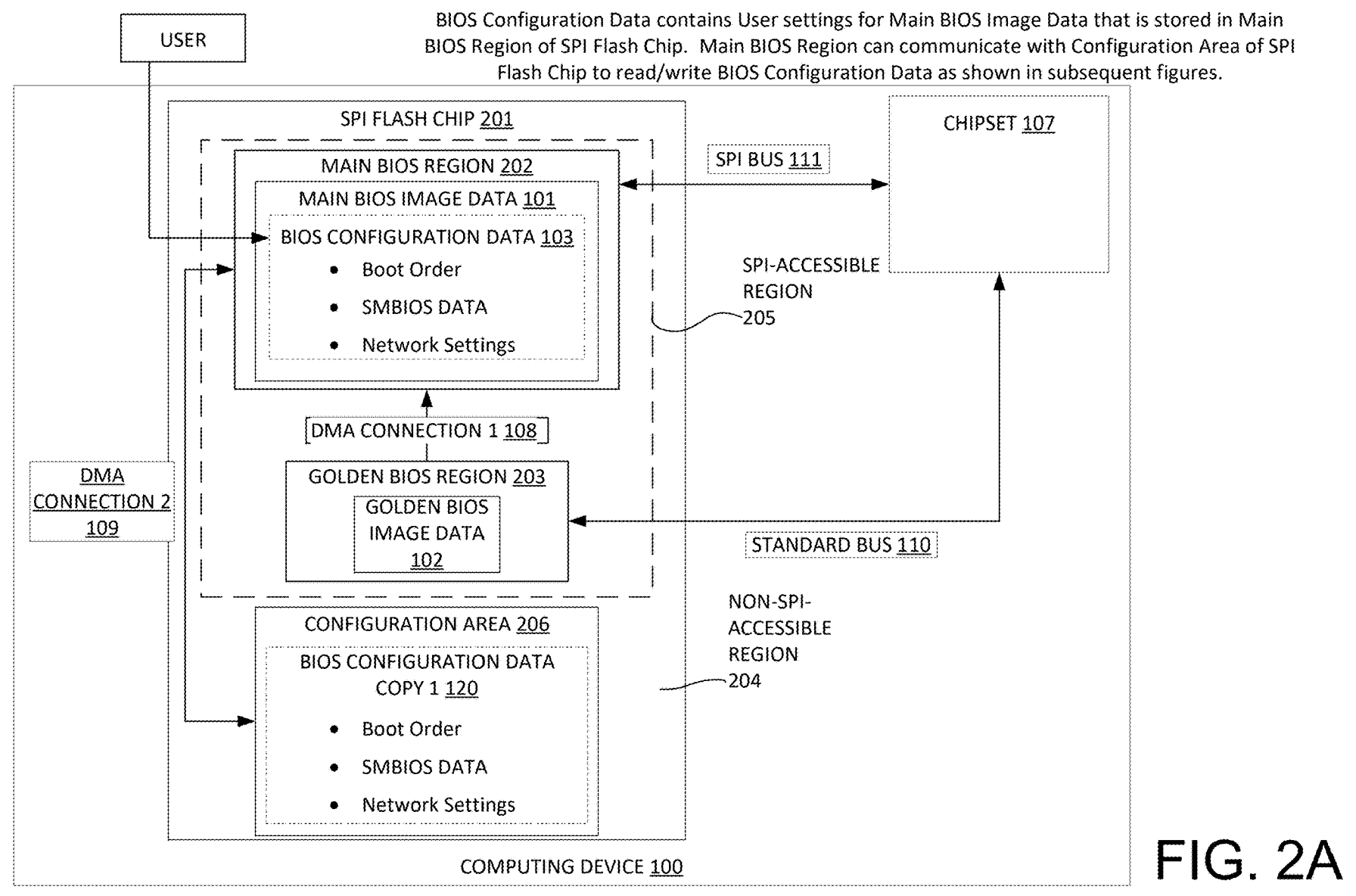

BIOS Configuration Data contains User settings for Main BIOS Image Data that is stored in Main BIOS Region of SPI Flash Chip. Main BIOS Region can communicate with Configuration Area of SPI Flash Chip to read/write BIOS Configuration Data as shown in subsequent figures.

USER

SPI FLASH CHIP 201

MAIN BIOS REGION 202

MAIN BIOS IMAGE DATA 101

BIOS CONFIGURATION DATA 103

- Boot Order
- SMBIOS DATA
- Network Settings

SPI BUS 111

CHIPSET 107

SPI-ACCESSIBLE REGION 205

DMA CONNECTION 1 108

GOLDEN BIOS REGION 203

GOLDEN BIOS IMAGE DATA 102

STANDARD BUS 110

DMA CONNECTION 2 109

CONFIGURATION AREA 206

BIOS CONFIGURATION DATA COPY 1 120

- Boot Order
- SMBIOS DATA
- Network Settings

NON-SPI-ACCESSIBLE REGION 204

COMPUTING DEVICE 100

FIG. 2A

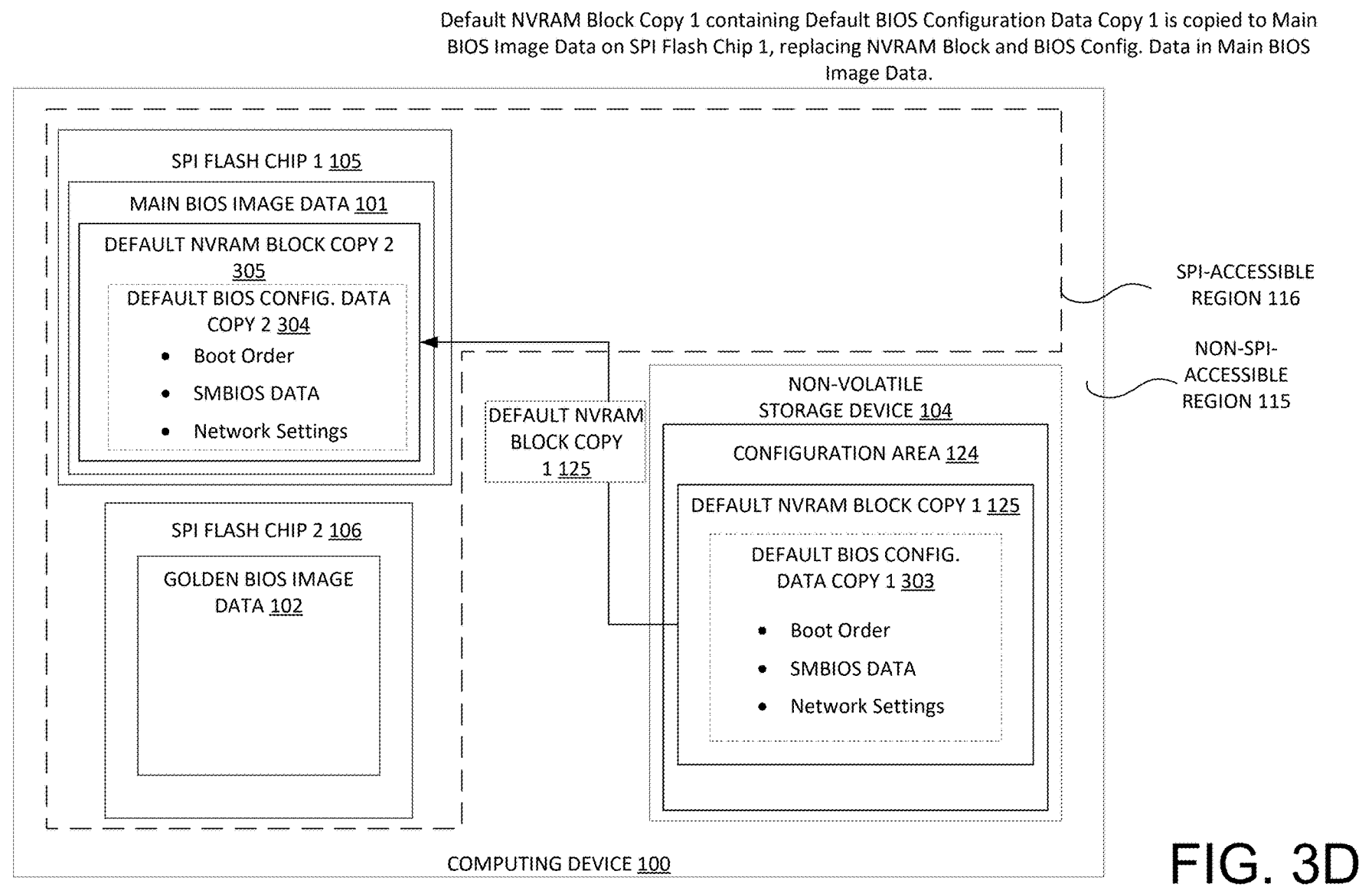

Default NVRAM Block Copy 1 containing Default BIOS Configuration Data Copy 1 is copied to Main BIOS Image Data on SPI Flash Chip 1, replacing NVRAM Block and BIOS Config. Data in Main BIOS Image Data.

SPI-ACCESSIBLE REGION 116

NON-SPI-ACCESSIBLE REGION 115

NON-VOLATILE STORAGE DEVICE 104

CONFIGURATION AREA 124

DEFAULT NVRAM BLOCK COPY 1 125

DEFAULT BIOS CONFIG. DATA COPY 1 303

- Boot Order
- SMBIOS DATA
- Network Settings

DEFAULT NVRAM BLOCK COPY 1 125

SPI FLASH CHIP 1 105

MAIN BIOS IMAGE DATA 101

DEFAULT NVRAM BLOCK COPY 2 305

DEFAULT BIOS CONFIG. DATA COPY 2 304

- Boot Order
- SMBIOS DATA
- Network Settings

SPI FLASH CHIP 2 106

GOLDEN BIOS IMAGE DATA 102

COMPUTING DEVICE 100

FIG. 3D

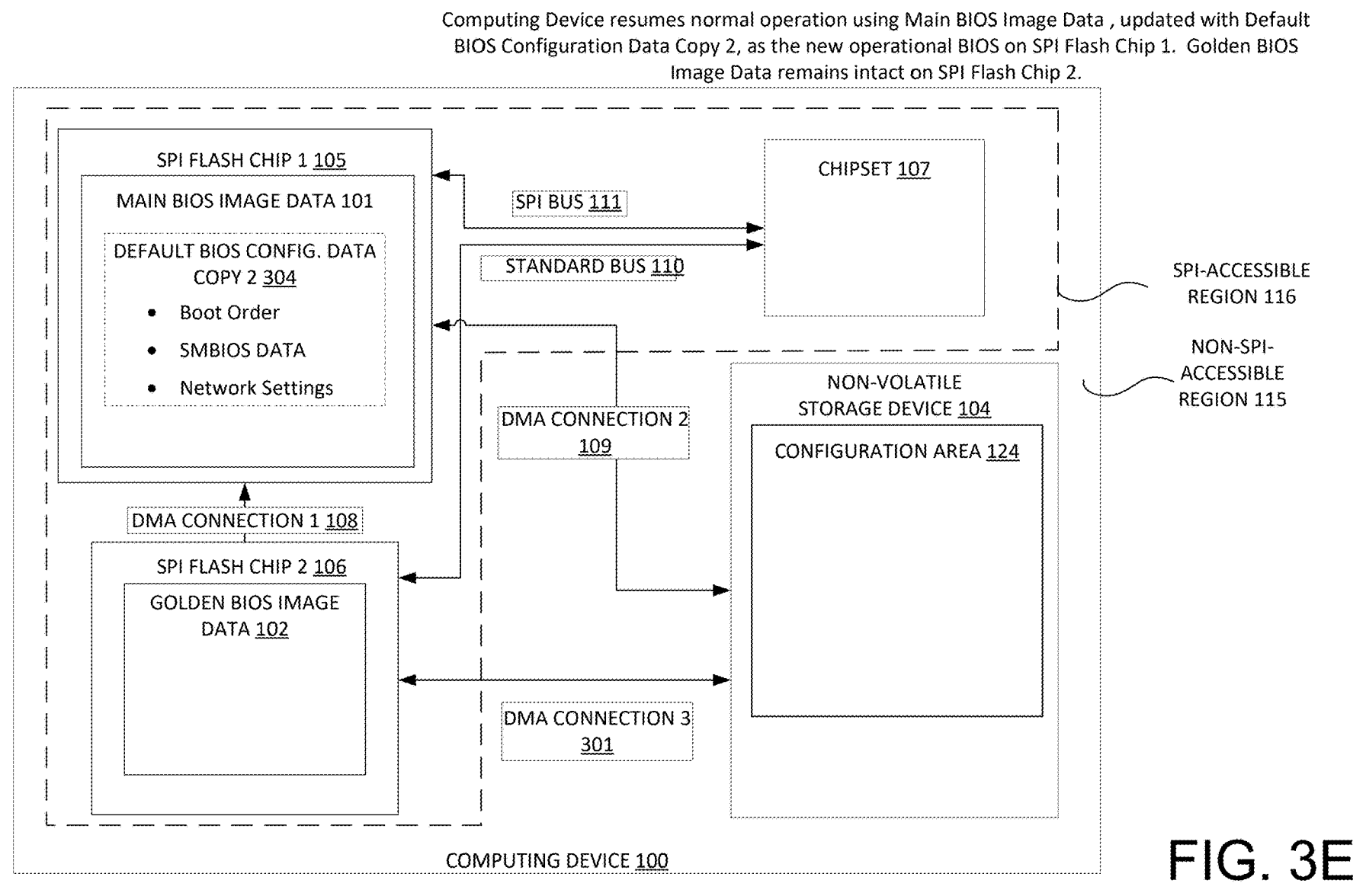

Computing Device resumes normal operation using Main BIOS Image Data , updated with Default BIOS Configuration Data Copy 2, as the new operational BIOS on SPI Flash Chip 1. Golden BIOS Image Data remains intact on SPI Flash Chip 2.

SPI FLASH CHIP 1 105
MAIN BIOS IMAGE DATA 101
DEFAULT BIOS CONFIG. DATA COPY 2 304
- Boot Order
- SMBIOS DATA
- Network Settings SPI BUS 111
STANDARD BUS 110
CHIPSET 107
SPI-ACCESSIBLE REGION 116
NON-SPI-ACCESSIBLE REGION 115
DMA CONNECTION 2 109
NON-VOLATILE STORAGE DEVICE 104
CONFIGURATION AREA 124
DMA CONNECTION 1 108
SPI FLASH CHIP 2 106
GOLDEN BIOS IMAGE DATA 102
DMA CONNECTION 3 301
COMPUTING DEVICE 100

FIG. 3E

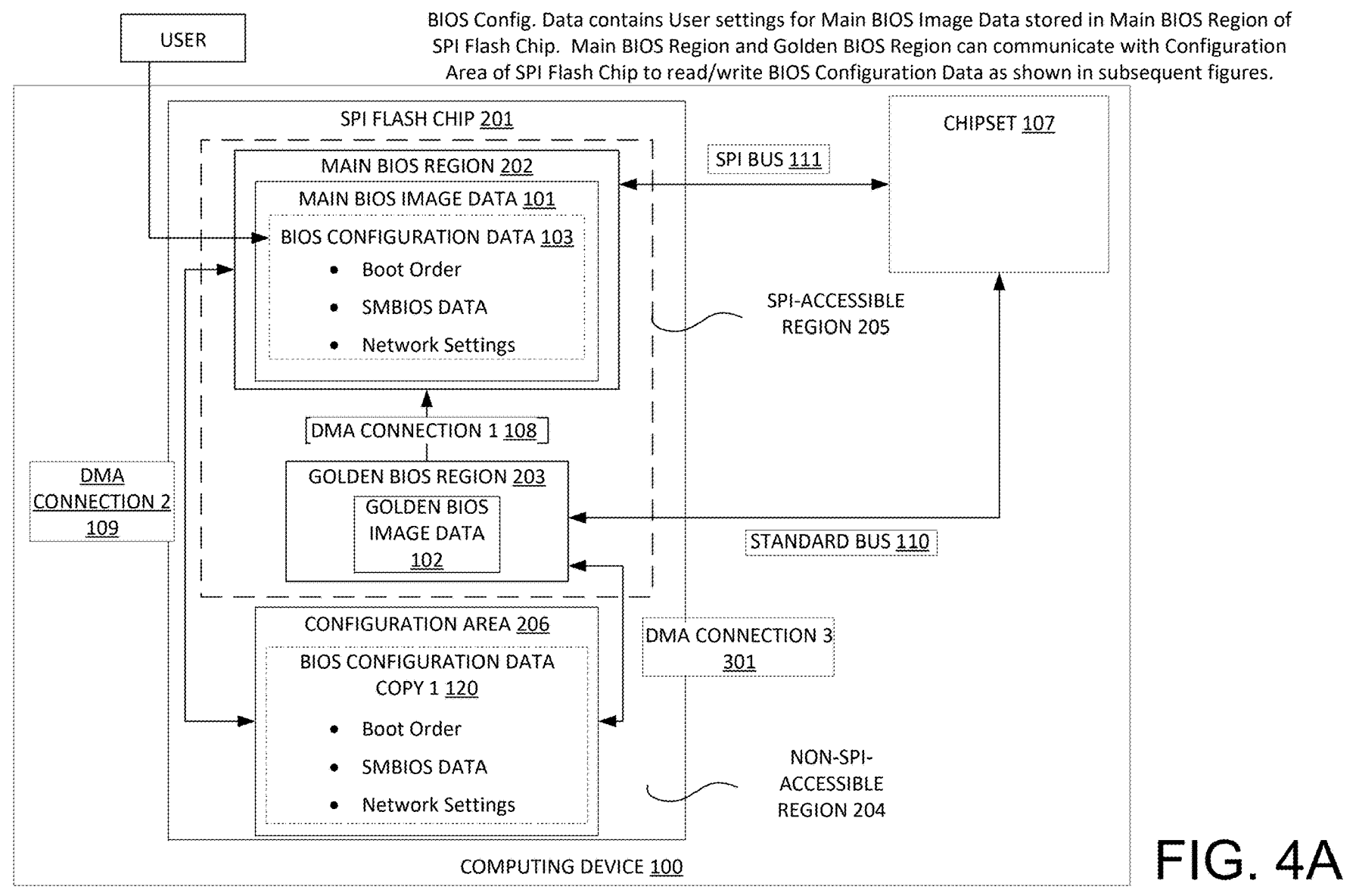

BIOS Config. Data contains User settings for Main BIOS Image Data stored in Main BIOS Region of SPI Flash Chip. Main BIOS Region and Golden BIOS Region can communicate with Configuration Area of SPI Flash Chip to read/write BIOS Configuration Data as shown in subsequent figures.

USER

CHIPSET 107

SPI BUS 111

SPI-ACCESSIBLE REGION 205

STANDARD BUS 110

DMA CONNECTION 3 301

NON-SPI-ACCESSIBLE REGION 204

SPI FLASH CHIP 201

MAIN BIOS REGION 202

MAIN BIOS IMAGE DATA 101

BIOS CONFIGURATION DATA 103

- Boot Order
- SMBIOS DATA
- Network Settings

DMA CONNECTION 1 108

GOLDEN BIOS REGION 203

GOLDEN BIOS IMAGE DATA 102

CONFIGURATION AREA 206

BIOS CONFIGURATION DATA COPY 1 120

- Boot Order
- SMBIOS DATA
- Network Settings

COMPUTING DEVICE 100

DMA CONNECTION 2 109

FIG. 4A

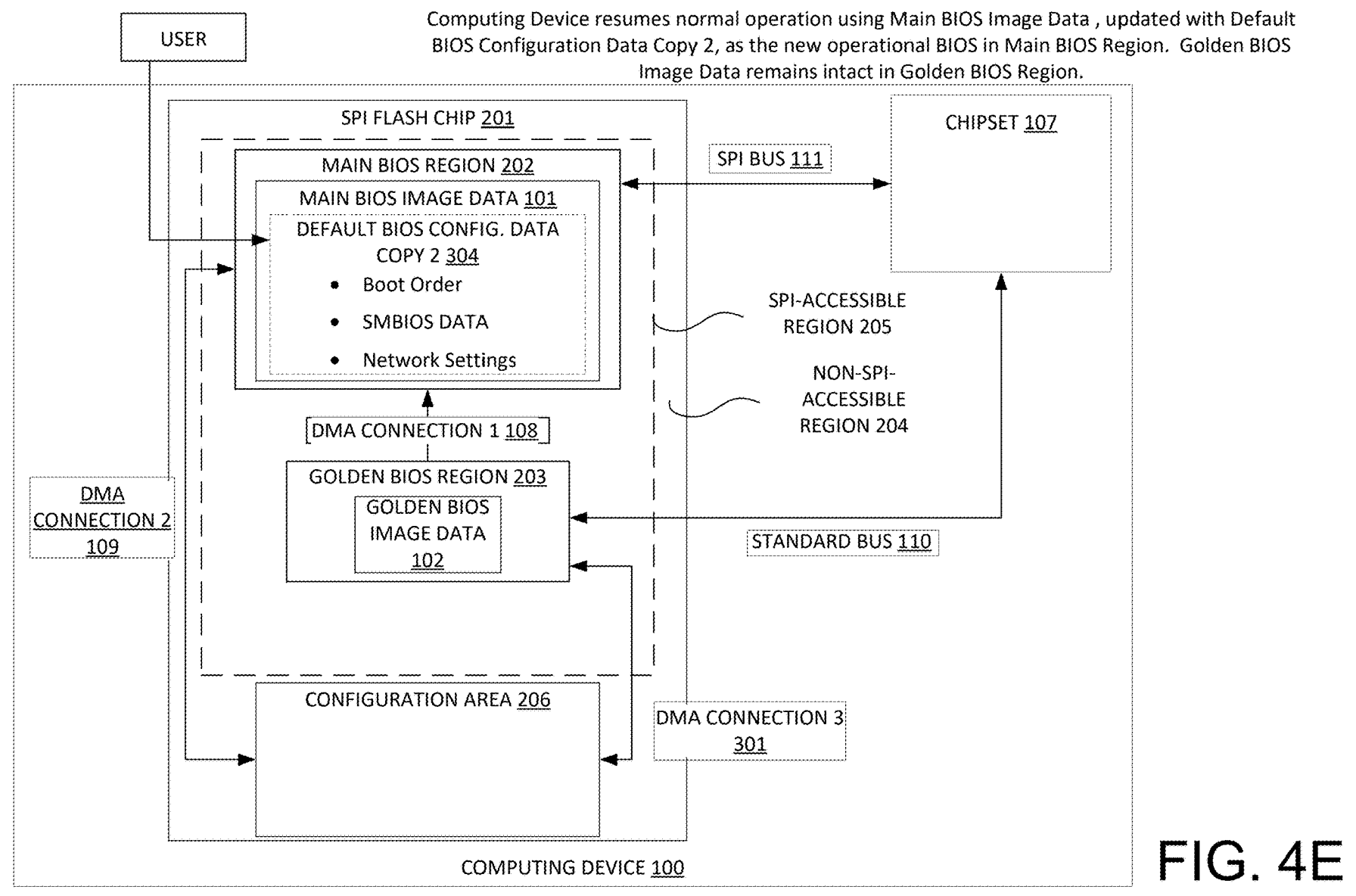

Computing Device resumes normal operation using Main BIOS Image Data , updated with Default BIOS Configuration Data Copy 2, as the new operational BIOS in Main BIOS Region. Golden BIOS Image Data remains intact in Golden BIOS Region.

USER
SPI FLASH CHIP 201
MAIN BIOS REGION 202
MAIN BIOS IMAGE DATA 101
DEFAULT BIOS CONFIG. DATA COPY 2 304
- Boot Order
- SMBIOS DATA
- Network Settings SPI BUS 111
CHIPSET 107
SPI-ACCESSIBLE REGION 205
NON-SPI-ACCESSIBLE REGION 204
DMA CONNECTION 1 108
GOLDEN BIOS REGION 203
GOLDEN BIOS IMAGE DATA 102
DMA CONNECTION 2 109
STANDARD BUS 110
CONFIGURATION AREA 206
DMA CONNECTION 3 301
COMPUTING DEVICE 100

FIG. 4E

PRESERVING BIOS CONFIGURATION DATA IN AN EMBEDDED COMPUTING DEVICE

BACKGROUND

Embedded computing devices play a critical role in rugged application environments, such as submarines, unmanned ariel vehicles, and other military applications. Once an embedded computing device is deployed to the field, the device cannot be reconfigured until after the deployment. Therefore, it is critical for an embedded computing device to function reliably when deployed to a rugged application environment. In particular, an embedded computing device must be able to ensure the continuity and integrity of any onboard firmware since the device cannot be flashed while in the field. Specifically, an embedded computing device must be able to ensure the continuity and integrity of BIOS firmware, which initializes hardware upon boot and provides an interface between the computing device's operating system and hardware.

An existing technique for ensuring the reliability of an embedded computing device's BIOS firmware is storing multiple versions of BIOS firmware on the embedded computing device. Specifically, multiple serial peripheral interface ("SPI") flash chips can be used to independently store a primary and a secondary copy of the BIOS. SPI flash chips are a form of non-volatile memory, making them capable of retaining data without power. SPI flash chips also communicate with at least one other component of the computing device using an SPI BUS and the SPI communication protocol.

A first SPI flash chip stores the primary copy of the BIOS, referred to as the "Main BIOS" or "operational BIOS," that is used by the computing device during normal operation. The first SPI flash chip is user accessible, and the Main BIOS can be updated and configured according to a user's preferences prior to the computing device being deployed to the field. The secondary copy of the BIOS, referred to as the "Golden BIOS" or "backup BIOS," is stored on a second SPI flash chip that is a write-once, read-only memory and serves as a backup to the Main BIOS.

In the event the Main BIOS becomes corrupted while the embedded computing device is deployed to a rugged application environment, the device can recover and continue operating by booting from the Golden BIOS and copying the Golden BIOS to the first SPI flash chip, thereby creating a copy of the Golden BIOS that acts as the new Main BIOS.

One technical challenge of maintaining independent copies of BIOS firmware is preserving BIOS configuration data in the event the Main BIOS becomes corrupted and is replaced by a copy of the Golden BIOS. BIOS configuration data, such as user preference settings related to boot order, SMBIOS data, and network settings, is stored in the NVRAM block of the Main BIOS. When the Golden BIOS is copied from the second SPI flash chip to the first SPI flash chip during BIOS recovery, the NVRAM block containing the BIOS configuration data will be overwritten with the default NVRAM block and default BIOS configuration data of the Golden BIOS. Since BIOS configuration data, such as user preference settings, cannot be reconfigured until the computing device is physically accessible after deployment, the loss of the BIOS configuration data stored in the Main BIOS can lead to reduced performance of the embedded computing device while it is deployed to the rugged application environment.

SUMMARY

To address the above-described challenges, including the preservation of BIOS configuration data in an embedded computing device, the disclosed techniques utilize a non-volatile storage device comprising a dedicated configuration area for storing BIOS configuration data, such as a user's BIOS preference settings. In one illustrative example, BIOS configuration data is copied from a Main BIOS to the configuration area. When the Main BIOS becomes corrupted, it is replaced with a copy of a Golden BIOS. This can include overwriting the Main BIOS configuration data with the default settings of the Golden BIOS. The embedded computing device can access the configuration area and read the copy of the Main BIOS configuration data to the Golden BIOS copy that is now acting as the operational BIOS. Implementation of these features can achieve technical benefits such as, but not limited to, increased reliability and operational efficiency of the device in rugged application environments due to continued use of user-optimized settings.

In a first illustrative example, an embedded computing device comprises two SPI flash chips, a non-volatile storage device, and a chipset. Each SPI flash chip stores an independent copy of BIOS firmware. The first SPI flash chip is user accessible and contains the Main BIOS, which serves as the operational BIOS used by the computing device during normal operation. The second SPI flash chip is a write-once, read-only memory that contains a Golden BIOS, which serves as a backup to the Main BIOS.

The second SPI flash chip is connected to the first SPI flash chip by a first Direct Memory Access ("DMA") connection that is unidirectional, ensuring the first chip's access to the second chip is read-only. DMA is a mechanism that allows data to be transferred directly between different storage devices, or different regions within a single storage device, without involving the computing device's CPU.

The chipset manages communication between various components of the embedded computing device and is connected to the first SPI flash chip by an SPI bus and to the second SPI flash chip by a non-SPI BUS connection.

The non-volatile storage device comprises a configuration area that is used to store a copy of the NVRAM block from the Main BIOS. The NVRAM block contains BIOS configuration data for the Main BIOS, such as user preference settings related to the BIOS. The non-volatile storage device is connected to the first SPI flash chip by a second DMA connection that is bi-directional, giving the first SPI flash chip read and write access to the configuration area of the non-volatile storage device.

When a user accesses the first SPI flash chip and configures settings for the Main BIOS, the NVRAM block of the Main BIOS is copied from the first SPI chip to the configuration area of the non-volatile memory device via the second DMA connection. The copy of the NVRAM block is stored on the non-volatile storage device until the Main BIOS becomes corrupt, and a BIOS recovery is initiated.

Upon boot, the chipset accesses the first SPI flash device to initialize hardware in the computing device using the Main BIOS. If the chipset receives a boot error indicating the Main BIOS is corrupt, or otherwise inoperable, the computing device resets, and the chipset accesses the second SPI flash chip via the non-SPI BUS to boot from the Golden BIOS. After the computing device boots from the Golden BIOS, the Golden BIOS is copied from the second SPI flash chip to the first SPI flash chip. The copy of the Main BIOS NVRAM block stored in the configuration area of the non-volatile storage device is then read to the first SPI chip, updating the copy of the Golden BIOS and creating a new operational BIOS that preserves the BIOS configuration data from the Main BIOS. Upon a subsequent reboot, the preserved BIOS configuration data is then accessed by the computing device to control one or more BIOS operations, such as accessing SMBIOS data to obtain or modify information about the computing device, selecting a device boot order to control the order of one or more devices used in subsequent boots of the computing device, or modifying network settings to change how the computing device interacts with one or more networks.

In a second illustrative example, an embedded computing device comprises one SPI flash chip and a chipset. The SPI flash chip further comprises a Main BIOS region, a Golden BIOS region, and a configuration area. The Main BIOS region and the Golden BIOS region each store an independent copy of BIOS firmware. The Main BIOS region is user accessible and contains the Main BIOS, which serves as the operational BIOS used by the computing device during normal operation. The Golden BIOS region is a write-once, read-only region that contains a Golden BIOS, which serves as a backup to the Main BIOS. The Golden BIOS region is connected to the Main BIOS region by a first Direct Memory Access ("DMA") connection that is unidirectional and ensures the Main BIOS region's access to the Golden BIOS region is read-only.

The chipset manages communication between various components of the embedded computing device and is connected to the Main BIOS region by an SPI bus and to the Golden BIOS region by a non-SPI BUS connection.

The configuration area is used to store a copy of the Main BIOS NVRAM block, which contains BIOS configuration data, such as user preference settings related to the BIOS. The configuration area is connected to the Main BIOS region by a second DMA connection that is bi-directional, giving the Main BIOS region read and write access to the configuration area.

When a user accesses the Main BIOS region and configures settings for the Main BIOS, the NVRAM block of the Main BIOS is copied from the Main BIOS region to the configuration area via the second DMA connection. The copy of the NVRAM block is stored in the configuration area until the Main BIOS becomes corrupt, and a BIOS recovery is initiated.

Upon boot, the chipset accesses the Main BIOS region to initialize hardware in the computing device using the Main BIOS. If the chipset receives a boot error indicating the Main BIOS is corrupt, or otherwise inoperable, the computing device resets, and the chipset accesses the Golden BIOS region via the non-SPI BUS to boot from the Golden BIOS. After the computing device boots from the Golden BIOS, the Golden BIOS is copied from the Golden BIOS region to the Main BIOS region. The copy of the Main BIOS NVRAM block stored in the configuration area is then read to the Main BIOS region, updating the copy of the Golden BIOS and creating a new operational BIOS that preserves the BIOS configuration data from the Main BIOS. Upon a subsequent reboot, the preserved BIOS configuration data is then accessed by the computing device to control one or more BIOS operations, such as accessing SMBIOS data to obtain or modify information about the computing device, selecting a device boot order to control the order of one or more devices used in subsequent boots of the computing device, or modifying network settings to change how the computing device interacts with one or more networks.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1C is a computing device architecture diagram showing the third stage of the mechanism of FIG. 1A where a chipset is unable to boot from a Main BIOS and must boot from a Golden BIOS.

FIG. 1E is a computing device architecture diagram showing the fifth stage of the mechanism of FIG. 1A where BIOS configuration data is being read from a third memory device to a first memory device.

FIG. 1F is a computing device architecture diagram showing the sixth stage of the mechanism of FIG. 1A where an embedded computing device resumes normal operation after performing a BIOS recovery.

FIG. 2A is a computing device architecture diagram showing the first stage of a second mechanism disclosed herein for preserving BIOS configuration data in an embedded computing device.

FIG. 3D is a computing device architecture diagram showing the fourth stage of the mechanism of FIG. 3A where BIOS configuration data is being read from a third memory device to a first memory device.

FIG. 3E is a computing device architecture diagram showing the fifth stage of the mechanism of FIG. 3A where an embedded computing device resumes normal operation after performing a BIOS recovery.

FIG. 4A is a computing device architecture diagram showing the first stage of a fourth mechanism disclosed herein for preserving BIOS configuration data in an embedded computing device.

FIG. 4E is a computing device architecture diagram showing the fifth stage of the mechanism of FIG. 4A where an embedded computing device resumes normal operation after performing a BIOS recovery.

DETAILED DESCRIPTION

To address the challenge of preserving BIOS configuration data in an embedded computing device, the disclosed techniques utilize a non-volatile storage device comprising a dedicated configuration area for storing BIOS configuration data, such as a user's BIOS preference settings.

BIOS configuration data is copied from a Main BIOS to the configuration area. When the Main BIOS becomes corrupted, it is replaced with a copy of a Golden BIOS, overwriting the Main BIOS configuration data with the default settings of the Golden BIOS. The embedded computing device can access the configuration area and read the copy of the Main BIOS configuration data to the Golden BIOS copy that is now acting as the operational BIOS.

Implementation of the above features can achieve technical benefits such as, but not limited to, increased reliability and operational efficiency of the device in rugged application environments due to continued use of user-optimized settings. Additional details regarding these aspects will be provided below with regard to FIGS. 1-6.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations, or examples. The drawings herein are not drawn to scale. Like numerals represent like elements throughout the several figures (which might be referred to herein as a "FIG." or "FIGS.").

Figure 1A:
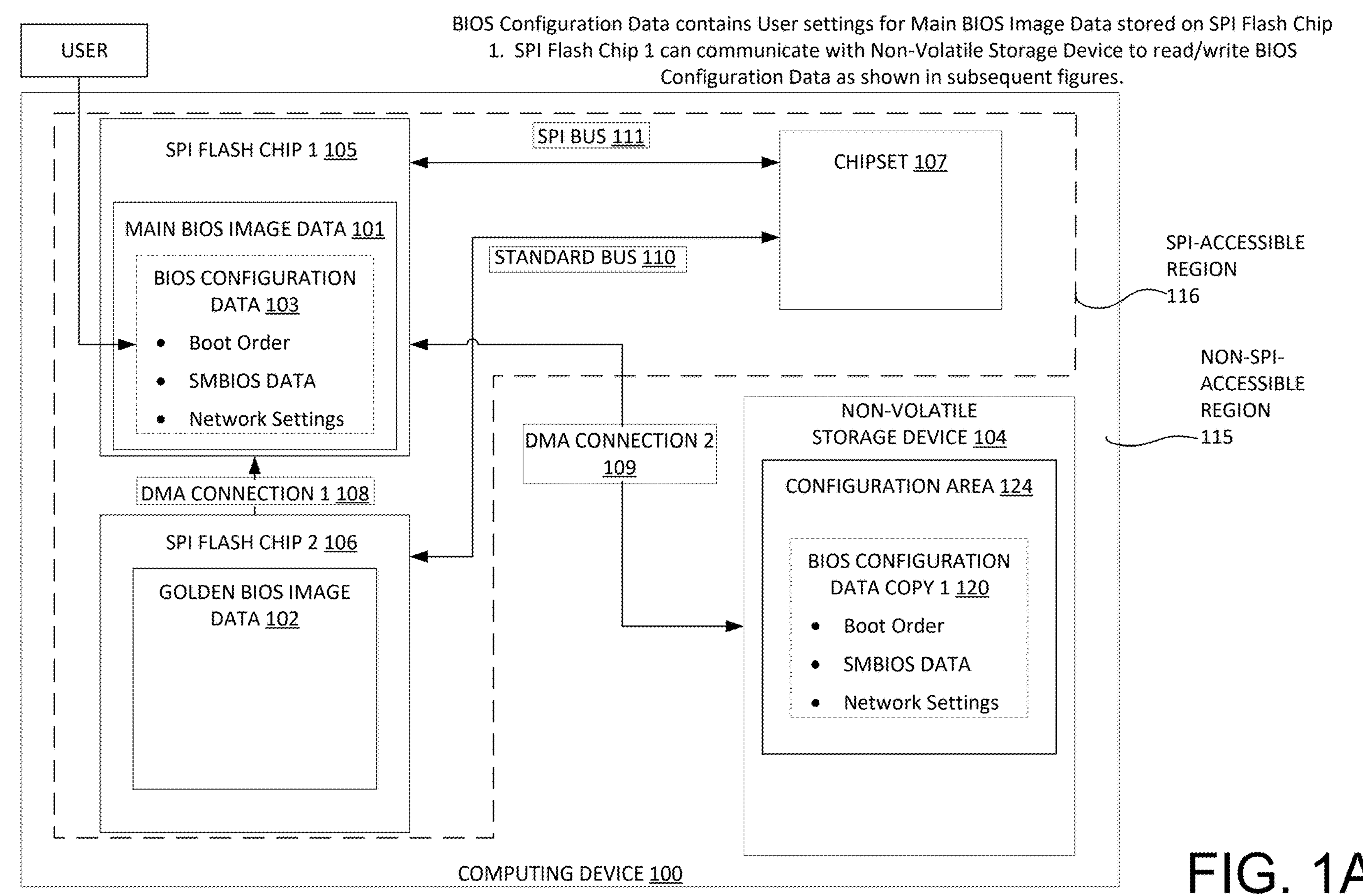
FIG. 1A is a computing device architecture diagram showing the first stage of one mechanism disclosed herein for preserving BIOS configuration data in an embedded computing device.

FIG. 1A is a computing system diagram illustrating aspects of a first embodiment of a computing device 100 that includes a serial peripheral interface ("SPI")-accessible region 116 and a non-SPI-accessible region 115. The SPI-accessible region contains a first SPI flash chip 105, a second SPI flash chip 106, and a chipset 107. The first SPI flash chip 105 is connected to the second SPI flash chip 106 by a first direct memory access ("DMA") connection 108 and to the chipset 107 by an SPI BUS 111. The first SPI flash chip 105 is user-accessible and contains Main BIOS image data 101 comprising BIOS configuration data 103 that is configured by a user. The second SPI flash chip 106 is a write-once, read-only memory that is inaccessible to a user and contains Golden BIOS image data 102. The term user includes, but is not limited to, entities external to a memory device, such as a programmer, data interface, or application.

The non-SPI-accessible region 115 contains a non-volatile storage device 104 that is connected to the first SPI flash chip 105 by a second DMA connection 109. The non-volatile storage device 104 comprises a configuration area 124 for storing a first BIOS configuration data copy 120 for use during BIOS recovery.

Figure 1B:
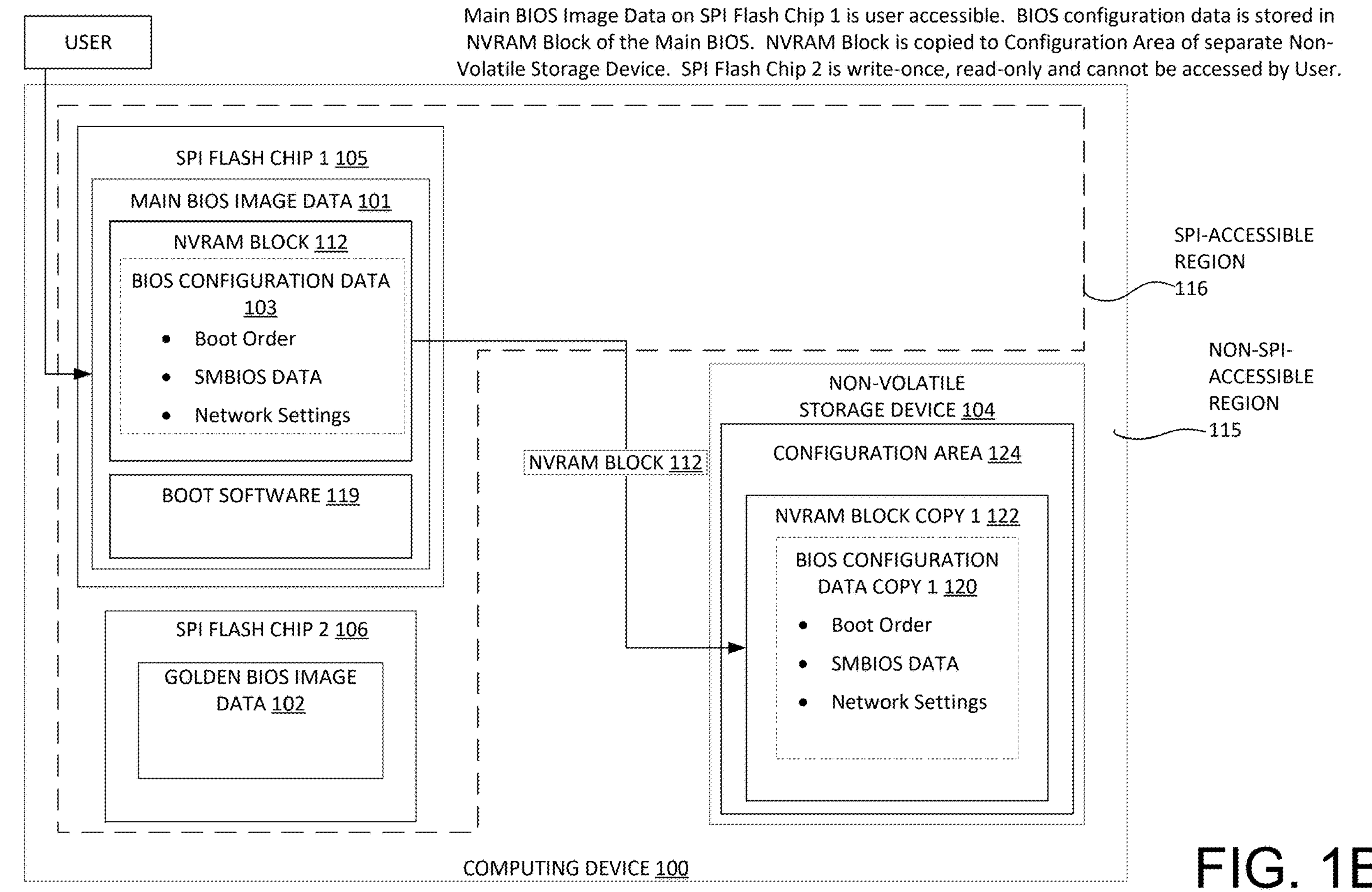
FIG. 1B is a computing device architecture diagram showing the second stage of the mechanism of FIG. 1A where BIOS configuration data is being backed up from a first memory device to a configuration area of a third memory device.

FIG. 1B shows the computing device 100 in a state where the Main BIOS image data 101 of the first SPI flash chip 105 has been accessed by a user to configure the BIOS configuration data 103. The BIOS configuration data 103 is stored in the NVRAM block 112 of the Main BIOS image data 101. The BIOS configuration data 103 includes user preference settings, such as boot order, SMBIOS data, and network settings. The NVRAM block 112 is copied from the first SPI flash chip 105 to the configuration area 124 of the non-volatile storage device 104. The operation of copying the NVRAM block 112 to the configuration area 124 creates a first NVRAM block copy 122 and a first BIOS configuration data copy 120.

FIG. 1C shows the computing device 100 in a state where the Main BIOS image data 101 is corrupt. Upon accessing the first SPI flash chip 105 at boot, the chipset 107 receives a boot error message indicating the Main BIOS image data 101 is corrupt. In response to the boot error, the computing device 100 resets, and the chipset 107 accesses the second SPI flash chip 106 to boot using the Golden BIOS image data 102.

Figure 1D:
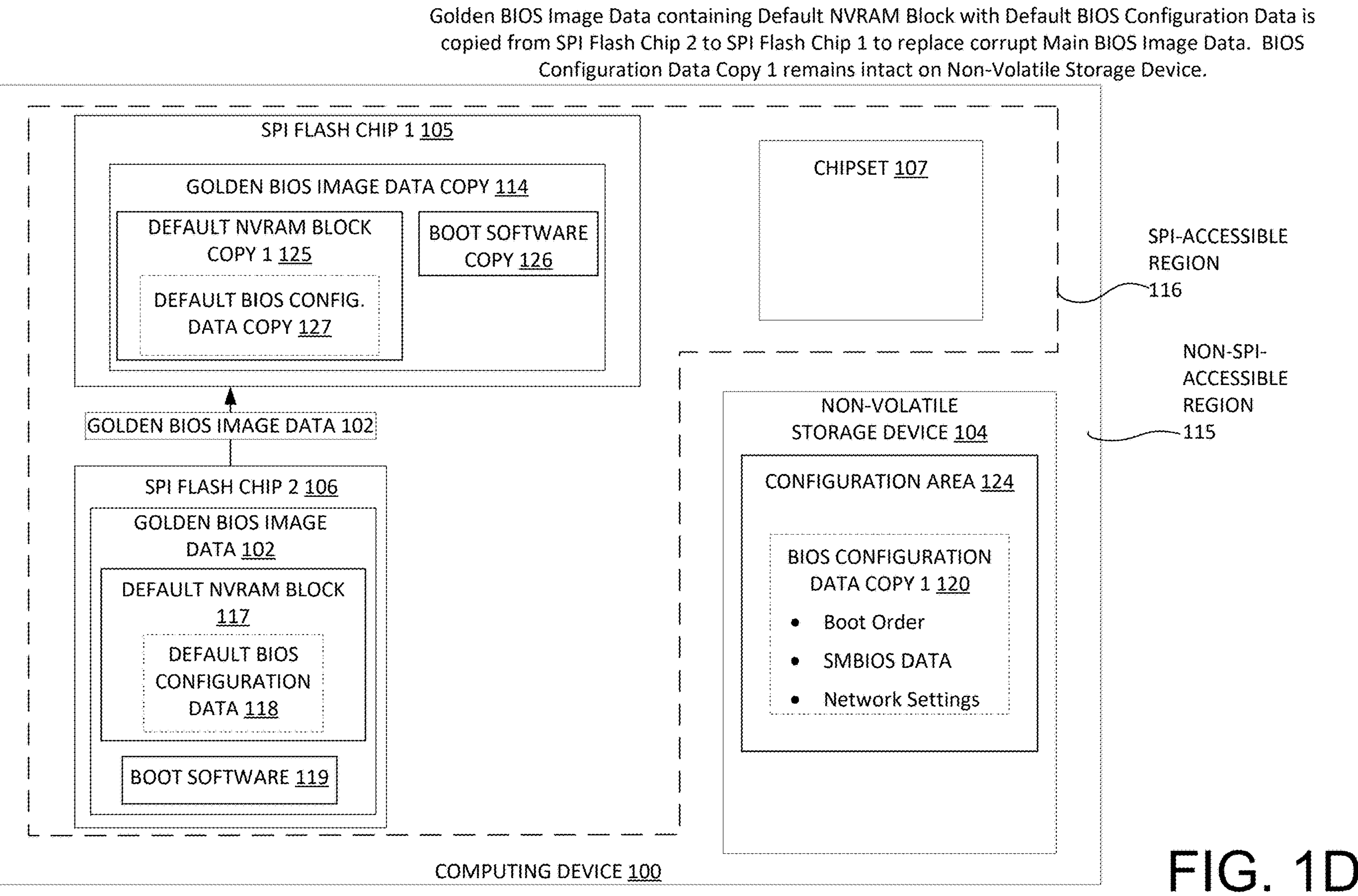
FIG. 1D is a computing device architecture diagram showing the fourth stage of the mechanism of FIG. 1A where a Golden BIOS is being copied from a second memory device to a first memory device to replace a corrupt Main BIOS.

FIG. 1D shows the computing device 100 in a state after it has successfully booted using the Golden BIOS image data 102 stored on the second SPI flash chip 106. The Golden BIOS image data 102 contains a default NVRAM block 117 comprising default BIOS configuration data 118. The Golden BIOS image data 102 is copied from the second SPI flash chip 106 to the first SPI flash chip 105. The operation of copying the Golden BIOS image data 102 to the first SPI flash chip 105 creates a first default NVRAM block copy 125 comprising a default BIOS configuration data copy 127. The Golden BIOS image data copy 114 replaces the corrupt Main BIOS image data 101, overwriting the NVRAM block 112 and the BIOS configuration data 103 in the process. The first BIOS configuration data copy 120 remains intact in the configuration area 124 of the non-volatile storage device 104.

FIG. 1E shows the computing device 100 in a state after the Golden BIOS image data 102 has been copied from the second SPI flash chip 106 to the first SPI flash chip 105. The first NVRAM block copy 122 comprising the first BIOS configuration data copy 120 is copied from the configuration area 124 to the first SPI flash chip 105. The operation of copying the first NVRAM block copy 122 to the first SPI flash chip 105 creates a second NVRAM block copy 123 comprising a second BIOS configuration data copy 121 within the Golden BIOS image data copy 114. The Golden BIOS image data 102 stored on the second SPI flash chip 106 remains intact.

FIG. 1F shows the computing device 100 in a state where the Golden BIOS image data copy 114 is now updated with the second BIOS configuration data copy 121. The computing device 100 resumes normal operation using the updated Golden BIOS image data copy 114 as a new operational BIOS on the first SPI flash chip 105, thereby preserving the BIOS configuration data 103 of the Main BIOS image data 101.

FIG. 2A is a computing system diagram illustrating aspects of a second embodiment of a computing device 100 that includes a chipset 107 and an SPI flash chip 201. The SPI flash chip 201 comprises an SPI-accessible region 205 and a non-SPI-accessible region 204. The SPI-accessible region 205 contains a Main BIOS region 202 and a Golden BIOS region 203. The Main BIOS region 202 is connected to the Golden BIOS region 203 by a first DMA connection 108 and to the chipset 107 by an SPI BUS 111. The Main BIOS region 202 is user-accessible and contains Main BIOS image data 101 comprising BIOS configuration data 103 that is configured by a user. The Golden BIOS region 203 is a write-once, read-only region that is inaccessible to a user, contains Golden BIOS image data 102, and is connected to the chipset 107 by a standard BUS 110.

The non-SPI-accessible region 204 contains a configuration area 206 that is connected to the Main BIOS region 202 by a second DMA connection 109. The configuration area 206 stores a first BIOS configuration data copy 120 for use during BIOS recovery.

Figure 2B:
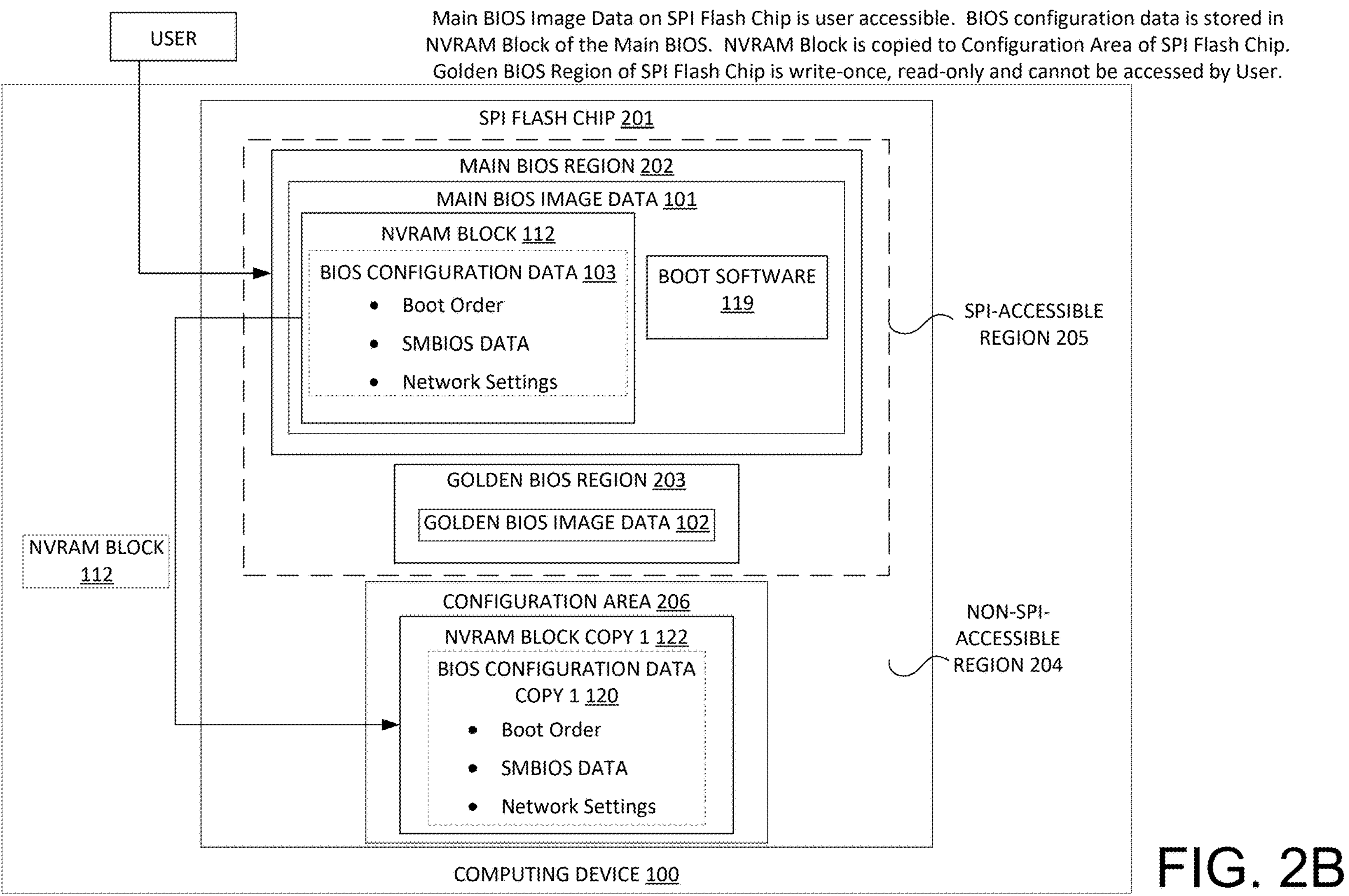
FIG. 2B is a computing device architecture diagram showing the second stage of the mechanism of FIG. 2A where BIOS configuration data is being backed up from a first region of a memory device to a configuration area.

FIG. 2B shows the computing device 100 in a state where the Main BIOS image data 101 of the Main BIOS region 202 has been accessed by a user to configure the BIOS configuration data 103. The BIOS configuration data 103 is stored in the NVRAM block 112 of the Main BIOS image data 101. The BIOS configuration data 103 includes user preference settings, such as boot order, SMBIOS data, and network settings. The NVRAM block 112 is copied from the Main BIOS region 202 to the configuration area 206. The operation of copying the NVRAM block 112 to the configuration area 206 creates a first NVRAM block copy 122 and a first BIOS configuration data copy 120.

Figure 2C:
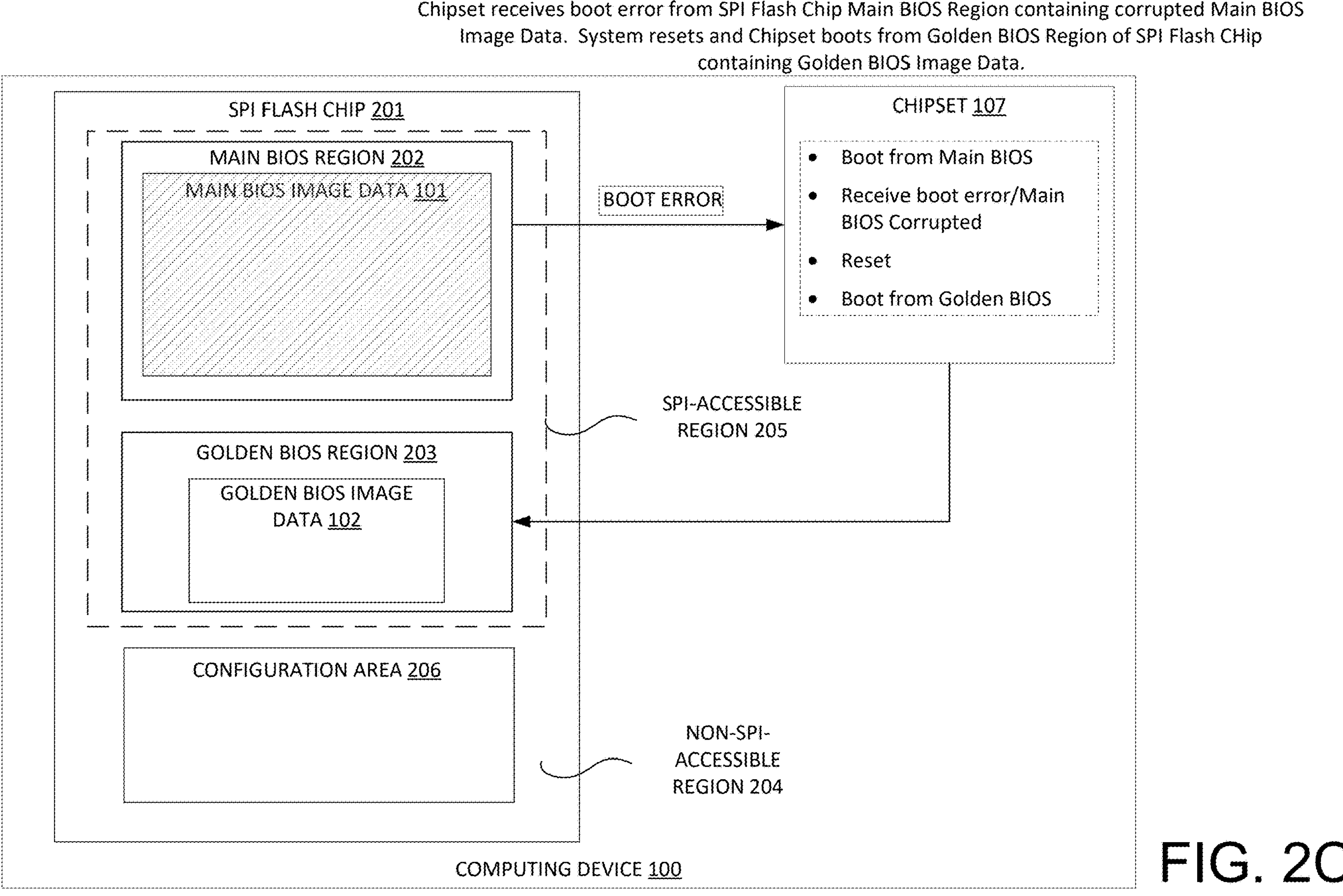
FIG. 2C is a computing device architecture diagram showing the third stage of the mechanism of FIG. 2A where a chipset is unable to boot from a Main BIOS and must boot from a Golden BIOS.

FIG. 2C shows the computing device 100 in a state where the Main BIOS image data 101 is corrupt. Upon accessing the Main BIOS region 202 at boot, the chipset 107 receives a boot error message indicating the Main BIOS image data 101 is corrupt. In response to the boot error, the computing device 100 resets, and the chipset 107 accesses the Golden BIOS region 203 to boot using the Golden BIOS image data 102.

Figure 2D:
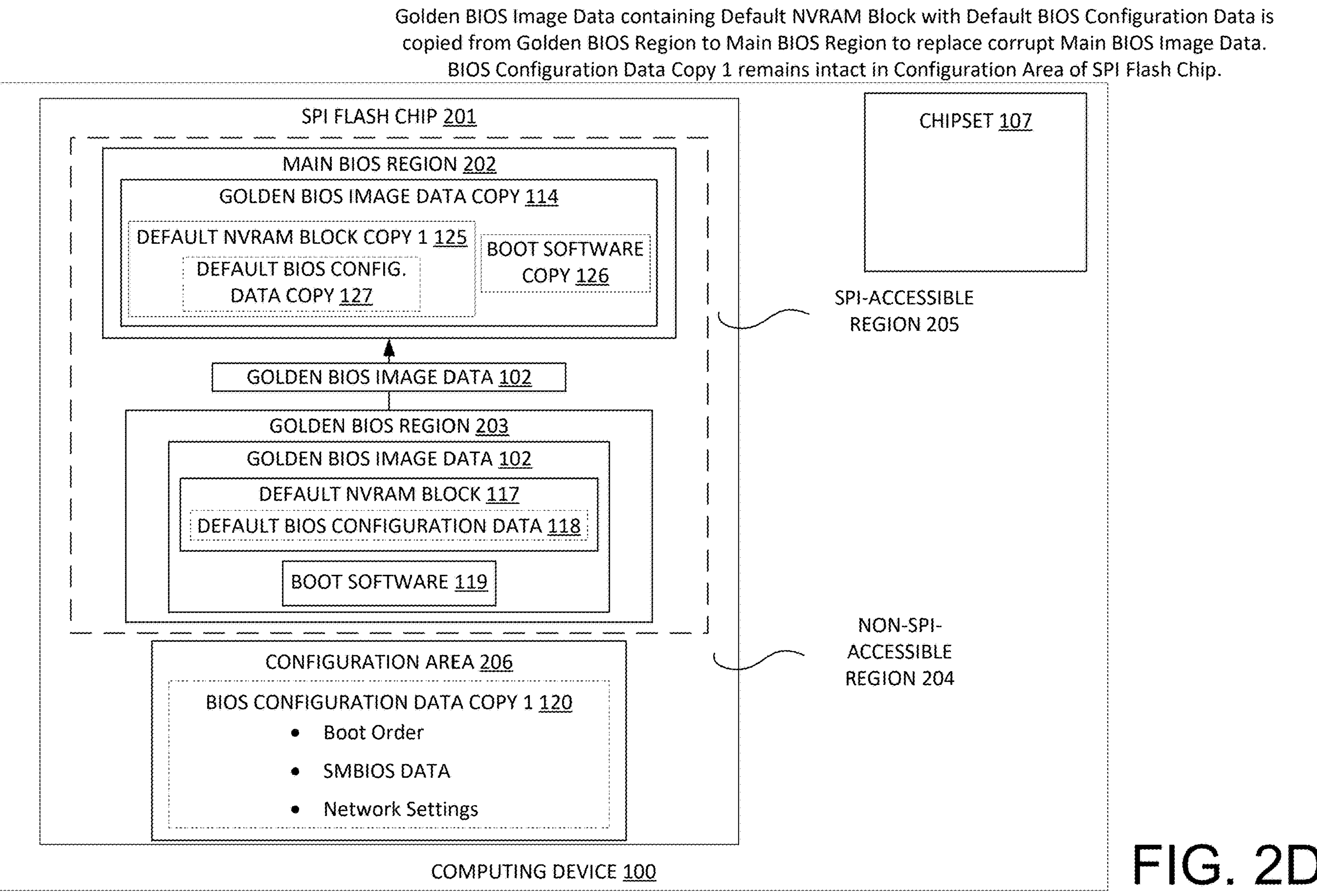
FIG. 2D is a computing device architecture diagram showing the fourth stage of the mechanism of FIG. 2A where a Golden BIOS is being copied from a second region of a memory device to a first region of a memory device to replace a corrupt Main BIOS.

FIG. 2D shows the computing device 100 in a state after it has successfully booted using the Golden BIOS image data 102 stored in the Golden BIOS region 203. The Golden BIOS image data 102 contains a default NVRAM block 117 comprising default BIOS configuration data 118. The Golden BIOS image data 102 is copied from the Golden BIOS region 203 to the Main BIOS region 202. The operation of copying the Golden BIOS image data 102 to the Main BIOS region 202 creates a first default NVRAM block copy 125 comprising a default BIOS configuration data copy 127. The Golden BIOS image data copy 114 replaces the corrupt Main BIOS image data 101, overwriting the NVRAM block 112 and the BIOS configuration data 103 in the process. The first BIOS configuration data copy 120 remains intact in the configuration area 206.

Figure 2E:
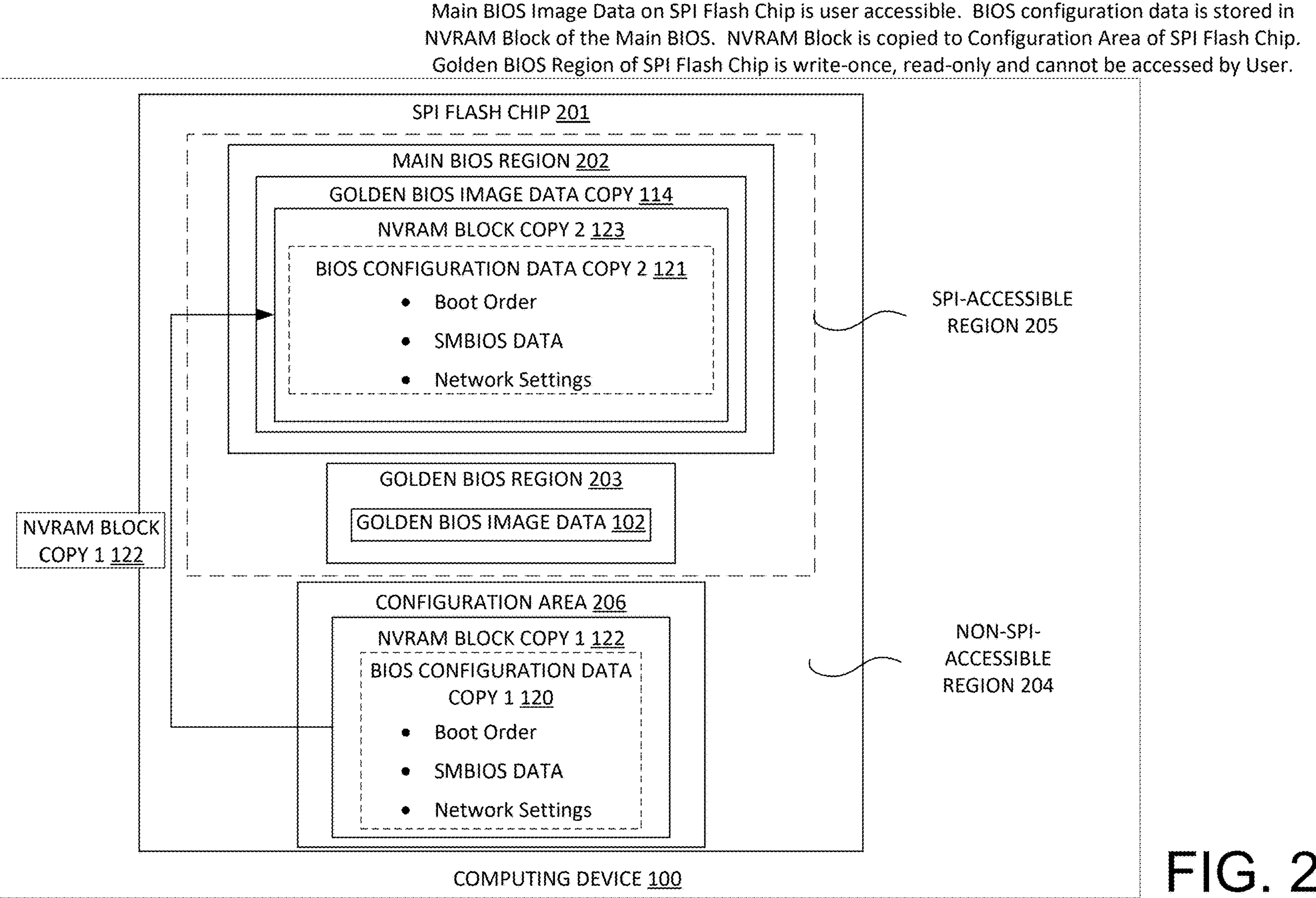
FIG. 2E is a computing device architecture diagram showing the fifth stage of the mechanism of FIG. 2A where BIOS configuration data is being read from a configuration area of a memory device to a first region of a memory device.

FIG. 2E shows the computing device 100 in a state after the Golden BIOS image data 102 has been copied from the Golden BIOS region 203 to the Main BIOS region 202. The first NVRAM block copy 122 comprising the first BIOS configuration data copy 120 is copied from the configuration area 206 to the Main BIOS region 202. The operation of copying the first NVRAM block copy 122 to the Main BIOS region 202 creates a second NVRAM block copy 123 comprising a second BIOS configuration data copy 121 within the Golden BIOS image data copy 114. The Golden BIOS image data 102 stored in the Golden BIOS region 203 remains intact.

Figure 2F:
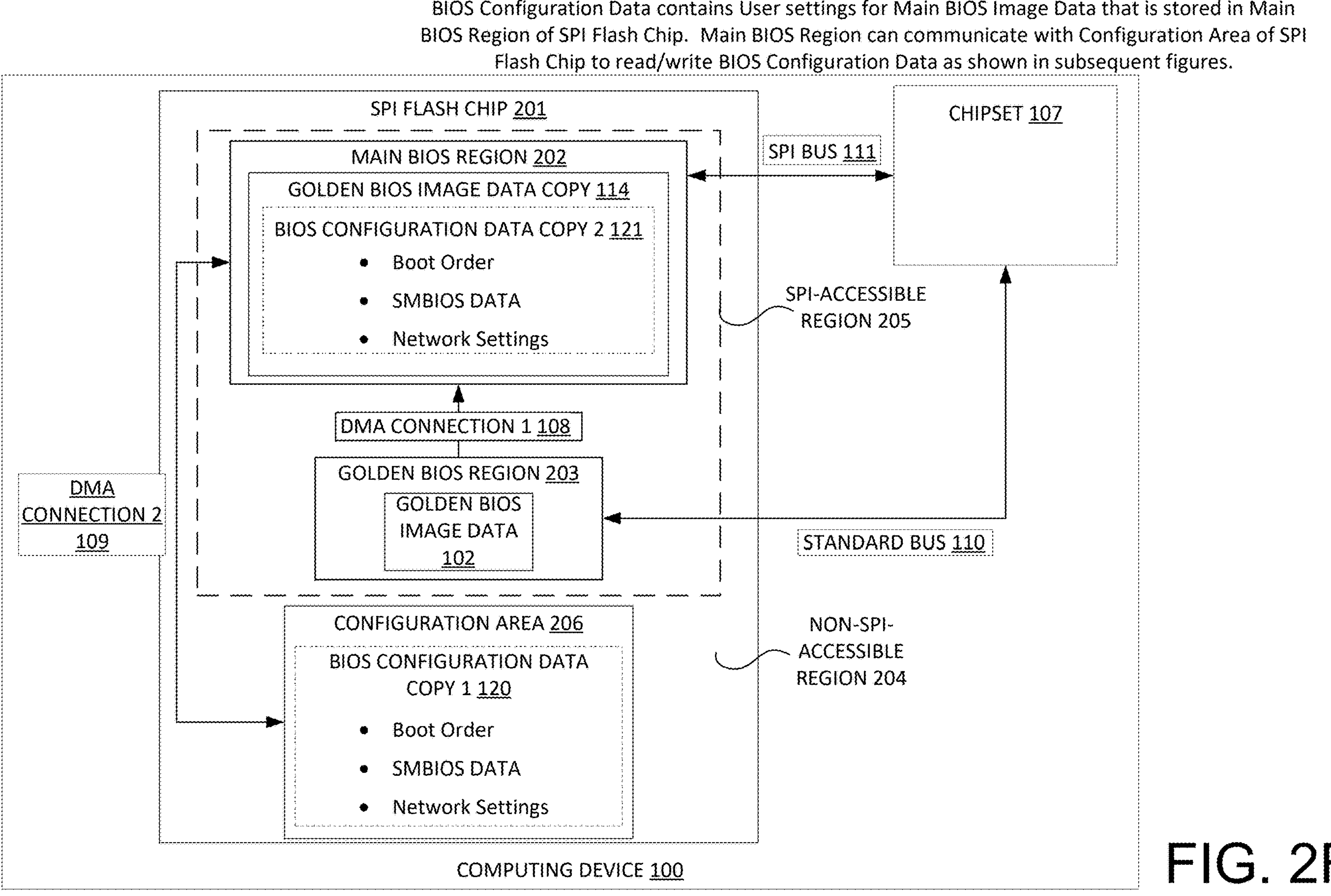
FIG. 2F is a computing device architecture diagram showing the sixth stage of the mechanism of FIG. 2A where an embedded computing device resumes normal operation after performing a BIOS recovery.

FIG. 2F shows the computing device 100 in a state where the Golden BIOS image data copy 114 is now updated with the second BIOS configuration data copy 121. The computing device 100 resumes normal operation using the updated Golden BIOS image data copy 114 as a new operational BIOS in the Main BIOS region 202, thereby preserving the BIOS configuration data 103 of the Main BIOS image data 101.

Figure 3A:
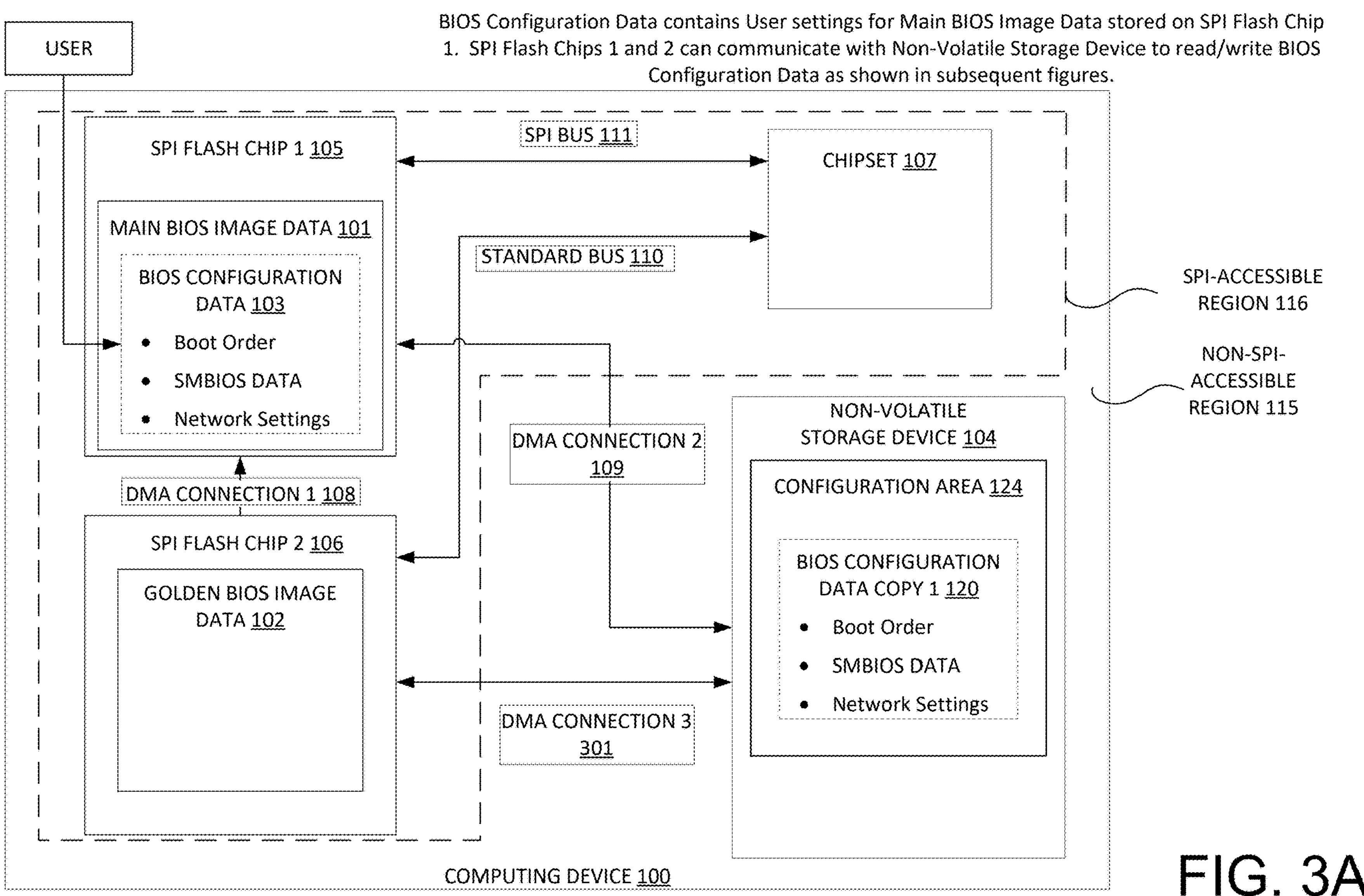
FIG. 3A is a computing device architecture diagram showing the first stage of a third mechanism disclosed herein for preserving BIOS configuration data in an embedded computing device.

FIG. 3A is a computing system diagram illustrating aspects of a third embodiment of a computing device 100 that is a variant of the first embodiment shown in FIG. 1A. The computing device 100 in this variant includes an SPI-accessible region 116 and a non-SPI-accessible region 115. The SPI-accessible region contains a first SPI flash chip 105, a second SPI flash chip 106, and a chipset 107. The first SPI flash chip 105 is connected to the second SPI flash chip 106 by a first DMA connection 108 and to the chipset 107 by an SPI BUS 111. The first SPI flash chip 105 is user-accessible and contains Main BIOS image data 101 comprising BIOS configuration data 103 that is configured by a user. The second SPI flash chip 106 is a write-once, read-only memory that is inaccessible to a user and contains Golden BIOS image data 102.

The non-SPI-accessible region 115 contains a non-volatile storage device 104. The non-volatile storage device 104 is connected to the first SPI flash chip 105 by a second DMA connection 109 and to the second SPI flash chip 106 by a third DMA connection 301. The non-volatile storage device 104 comprises a configuration area 124 for storing a first BIOS configuration data copy 120 for use during BIOS recovery.

Figure 3B:
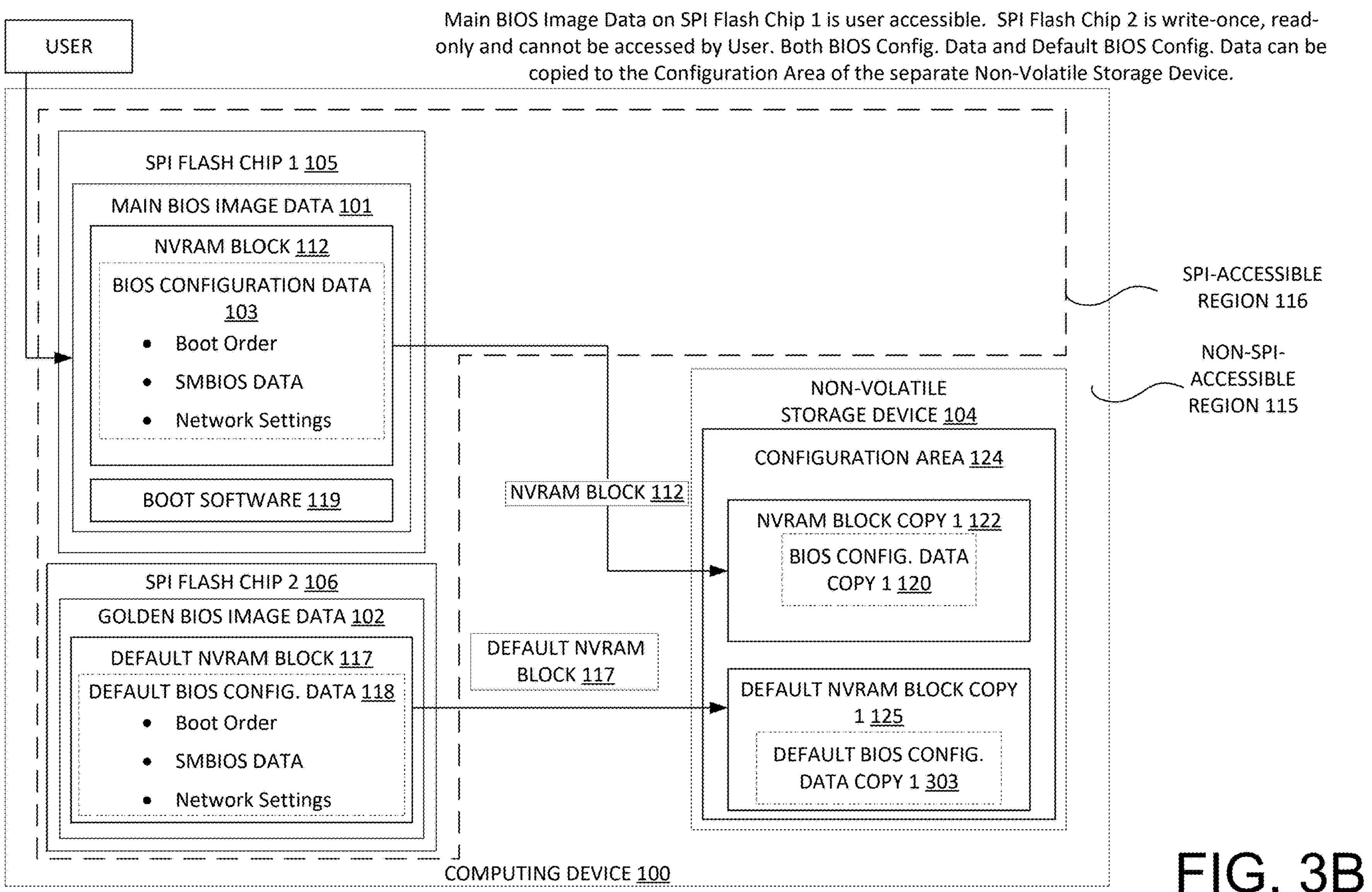
FIG. 3B is a computing device architecture diagram showing the second stage of the mechanism of FIG. 3A where BIOS configuration data is being backed up from a first memory device and a second memory device to a configuration area of a third memory device.

FIG. 3B shows the computing device 100 in a state where the Main BIOS image data 101 of the first SPI flash chip 105 has been accessed by a user to configure the BIOS configuration data 103. The BIOS configuration data 103 is stored in the NVRAM block 112 of the Main BIOS image data 101. The BIOS configuration data 103 includes user preference settings, such as boot order, SMBIOS data, and network settings. The NVRAM block 112 is copied from the first SPI flash chip 105 to the configuration area 124. The operation of copying the NVRAM block 112 to the configuration area 124 creates a first NVRAM block copy 122 and a first BIOS configuration data copy 120.

In this embodiment, the second SPI flash chip 106 also has write access to the configuration area 124 of the non-volatile storage device 104 via the third DMA connection 301. Default BIOS configuration data 118 is stored in the default NVRAM block 117 of the Golden BIOS image data 102. The default NVRAM block 117 of the Golden BIOS image data 102 is copied to the configuration area 124. The operation of copying the default NVRAM block 117 to the configuration area 124 creates a first default NVRAM block copy 125 comprising a first default BIOS configuration data copy 303.

Additional embodiments can also comprise a third DMA connection 301 that gives the second SPI flash chip 106 both read and write access to the configuration area 124, allowing data to be read from the configuration area 124 to the second SPI flash chip 106 and the Golden BIOS image data 102.

Figure 3C:
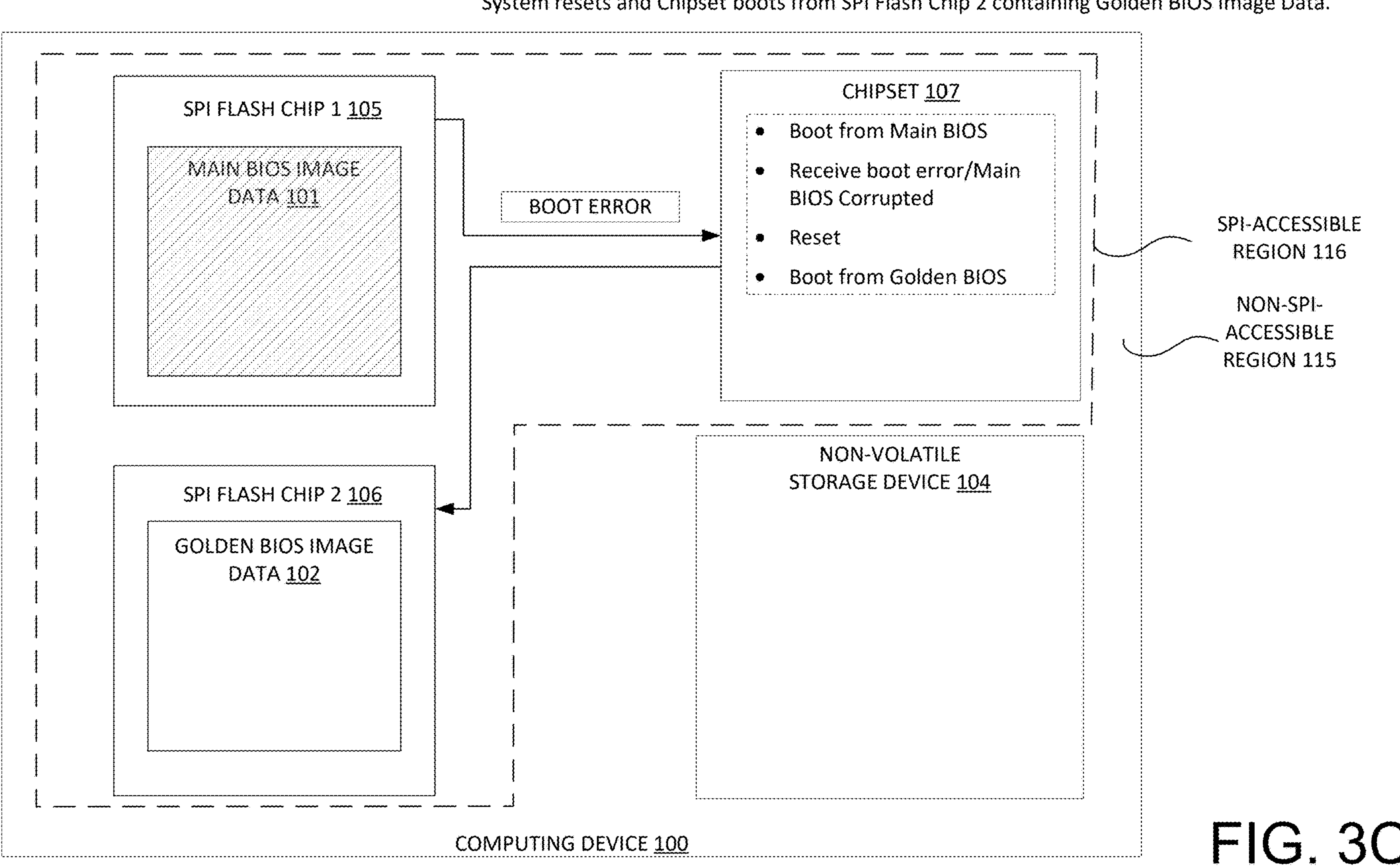
FIG. 3C is a computing device architecture diagram showing the third stage of the mechanism of FIG. 3A where a chipset is unable to boot from a Main BIOS and must boot from a Golden BIOS.

FIG. 3C shows the computing device 100 in a state where the Main BIOS image data 101 is corrupt. Upon accessing the first SPI flash chip 105 at boot, the chipset 107 receives a boot error message indicating the Main BIOS image data 101 is corrupt. In response to the boot error, the computing device 100 resets and the chipset 107 accesses the second SPI flash chip 106 to boot using the Golden BIOS image data 102.

FIG. 3D shows the computing device 100 in a state after it has successfully booted using the Golden BIOS image data 102 stored on the second SPI flash chip 106. The first default NVRAM block copy 125 comprising the first default BIOS configuration data copy 303 is copied from the configuration area 124 to the first SPI flash chip 105. The operation of copying the first default NVRAM block copy 125 to the first SPI flash chip 105 creates a second default NVRAM block copy 305 comprising a second default BIOS configuration data copy 304 within the Main BIOS image 101. The Golden BIOS image data 102 stored on the second SPI flash chip 106 remains intact.

Additional embodiments not shown can also comprise the chipset 107 booting from the Main BIOS image 101 before the first default NVRAM block copy 125 comprising the first default BIOS configuration data copy 303 is copied from the configuration area 124 to the first SPI flash chip 105.

FIG. 3E shows the computing device 100 in a state where the Main BIOS image data 101 is now updated with the second default BIOS configuration data copy 304. The computing device 100 resumes normal operation using the Main BIOS image data 101 as the operational BIOS on the first SPI flash chip 105, thereby restoring the Main BIOS image data to an operational state utilizing the default BIOS configuration data 118 of the Golden BIOS image data 102.

FIG. 4A is a computing system diagram illustrating aspects of a fourth embodiment of the computing device 100 that is a variant of the second embodiment shown in FIG. 2A. The computing device 100 in this variant includes a chipset 107 and an SPI flash chip 201. The SPI flash chip 201 comprises an SPI-accessible region 205 and a non-SPI-accessible region 204. The SPI-accessible region 205 contains a Main BIOS region 202 and a Golden BIOS region 203. The Main BIOS region 202 is connected to the Golden BIOS region 203 by a first DMA connection 108 and to the chipset 107 by an SPI BUS 111. The Main BIOS region 202 is user-accessible and contains Main BIOS image data 101 comprising BIOS configuration data 103 that is configured by a user. The Golden BIOS region 203 is a write-once, read-only region that is inaccessible to a user, contains Golden BIOS image data 102, and is connected to the chipset 107 by a standard BUS 110.

The non-SPI-accessible region 204 contains a configuration area 206. The configuration area 206 is connected to the Main BIOS region 202 by a second DMA connection 109 and to the Golden BIOS region 203 by a third DMA connection 301. The configuration area 206 stores a first BIOS configuration data copy 120 for use during BIOS recovery.

Figure 4B:
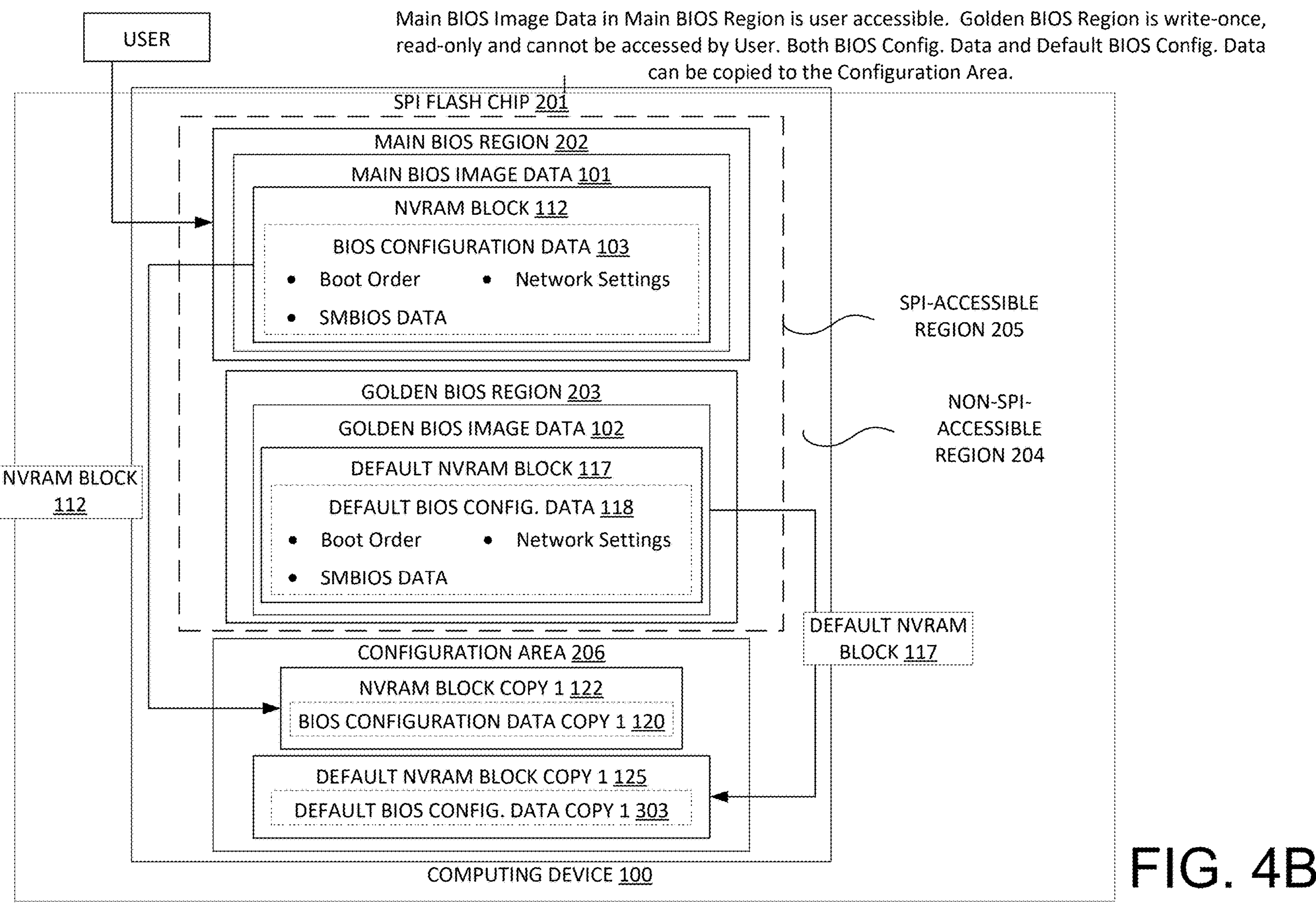
FIG. 4B is a computing device architecture diagram showing the second stage of the mechanism of FIG. 4A where BIOS configuration data is being backed up from a first region and a second region of a memory device to a configuration area.

FIG. 4B shows the computing device 100 in a state where the Main BIOS image data 101 of the Main BIOS region 202 has been accessed by a user to configure the BIOS configuration data 103. The BIOS configuration data 103 is stored in the NVRAM block 112 of the Main BIOS image data 101. The BIOS configuration data 103 includes user preference settings, such as boot order, SMBIOS data, and network settings. The NVRAM block 112 is copied from the Main BIOS region 202 to the configuration area 206. The operation of copying the NVRAM block 112 to the configuration area 206 creates a first NVRAM block copy 122 and a first BIOS configuration data copy 120.

In this embodiment, the Golden BIOS region 203 also has write access to the configuration area 206 via the third DMA connection 301. Default BIOS configuration data 118 is stored in the default NVRAM block 117 of the Golden BIOS image data 102. The default NVRAM block 117 of the Golden BIOS image data 102 is copied to the configuration area 206. The operation of copying the default NVRAM block 117 to the configuration area 206 creates a first default NVRAM block copy 125 comprising a first default BIOS configuration data copy 303.

Additional embodiments can also comprise a third DMA connection 301 that gives the Golden BIOS region 203 both read and write access to the configuration area 206, allowing data to be read from the configuration area 206 to the Golden BIOS region 203 and the Golden BIOS image data 102.

Figure 4C:
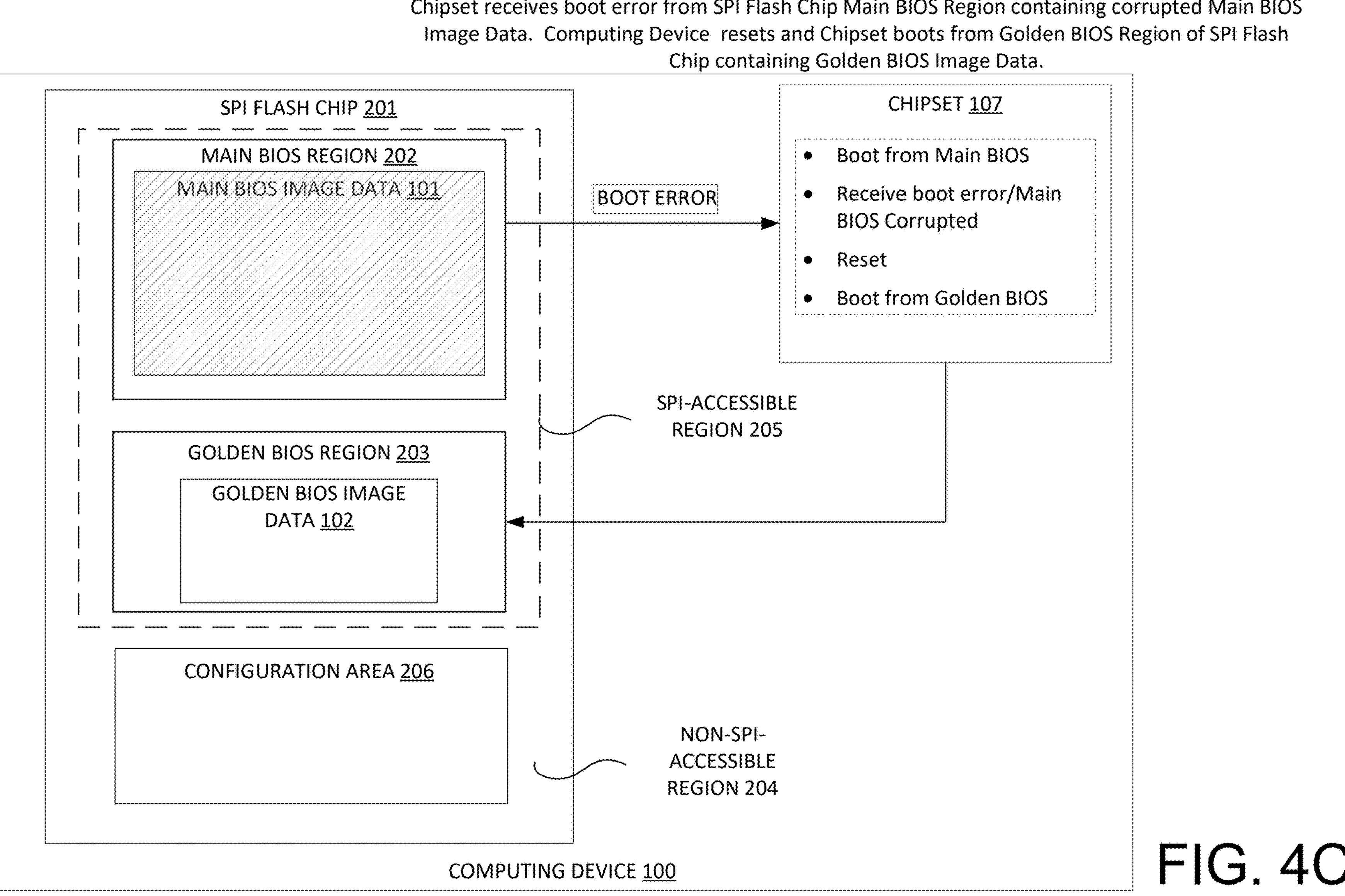
FIG. 4C is a computing device architecture diagram showing the third stage of the mechanism of FIG. 4A where a chipset is unable to boot from a Main BIOS and must boot from a Golden BIOS.

FIG. 4C shows the computing device 100 in a state where the Main BIOS image data 101 is corrupt. Upon accessing the Main BIOS region 202 at boot, the chipset 107 receives a boot error message indicating the Main BIOS image data 101 is corrupt. In response to the boot error, the computing device 100 resets and the chipset 107 accesses the Golden BIOS region 203 to boot using the Golden BIOS image data 102.

Figure 4D:
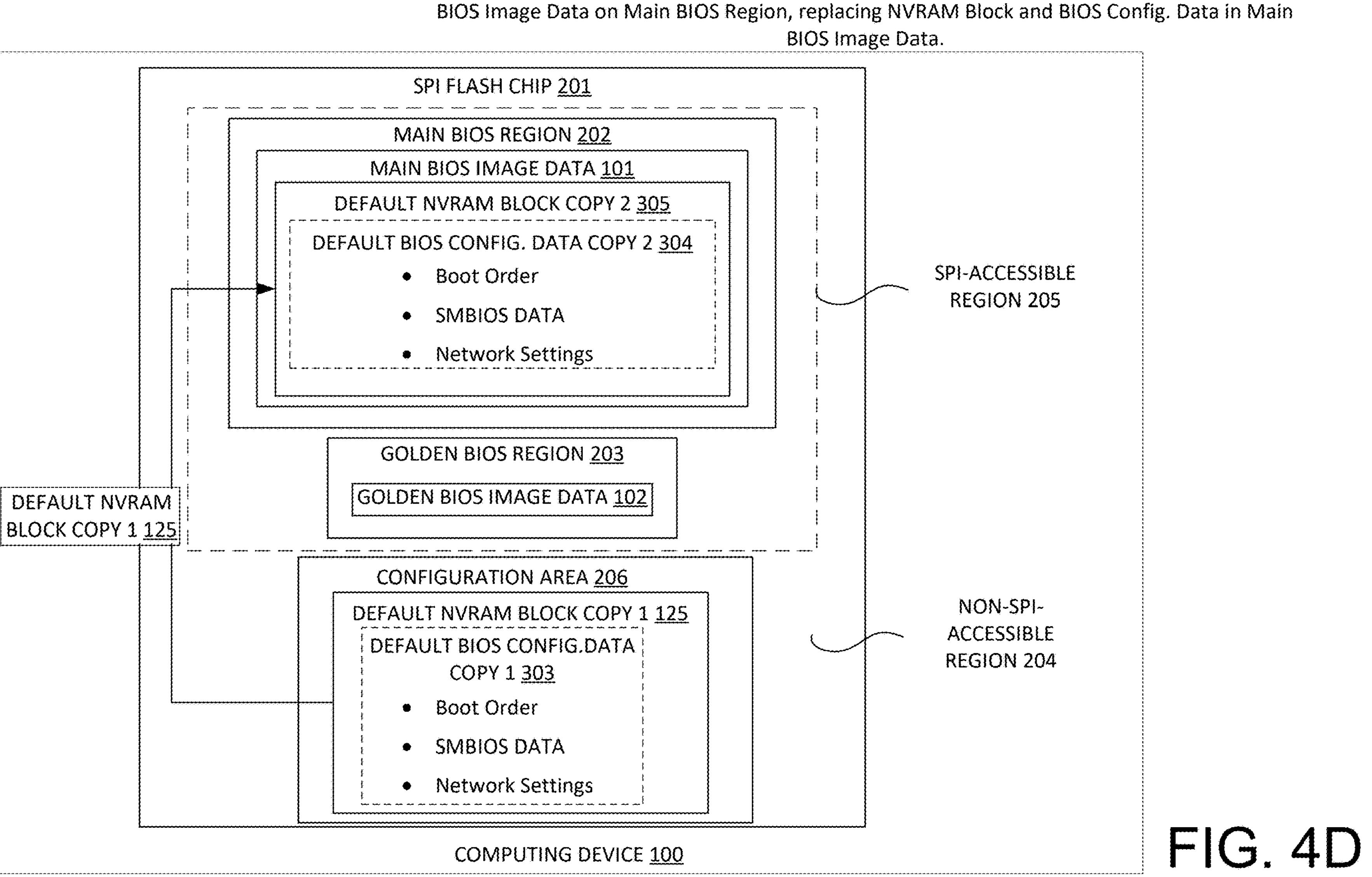
FIG. 4D is a computing device architecture diagram showing the fourth stage of the mechanism of FIG. 4A where BIOS configuration data is being read from a configuration area of a memory device to a first region of a memory device.

FIG. 4D shows the computing device 100 in a state after it has successfully booted using the Golden BIOS image data 102 stored in the Golden BIOS region 203. The first default NVRAM block copy 125 comprising the first default BIOS configuration data copy 303 is copied from the configuration area 206 to the Main BIOS region 202. The operation of copying the first default NVRAM block copy 125 to the Main BIOS region 202 creates a second default NVRAM block copy 305 comprising a second default BIOS configuration data copy 304 within the Main BIOS image 101. The Golden BIOS image data 102 stored in the Golden BIOS region 203 remains intact.

Additional embodiments not shown can also comprise the chipset 107 booting from the Main BIOS image 101 before the first default NVRAM block copy 125 comprising the first default BIOS configuration data copy 303 is copied from the configuration area 206 to the Main BIOS region 202.

FIG. 4E shows the computing device 100 in a state where the Main BIOS image data 101 is now updated with the second default BIOS configuration data copy 304. The computing device 100 resumes normal operation using the Main BIOS image data 101 as the operational BIOS in the Main BIOS region 202, thereby restoring the Main BIOS image data to an operational state utilizing the default BIOS configuration data 118 of the Golden BIOS image data 102.

Figure 5A:
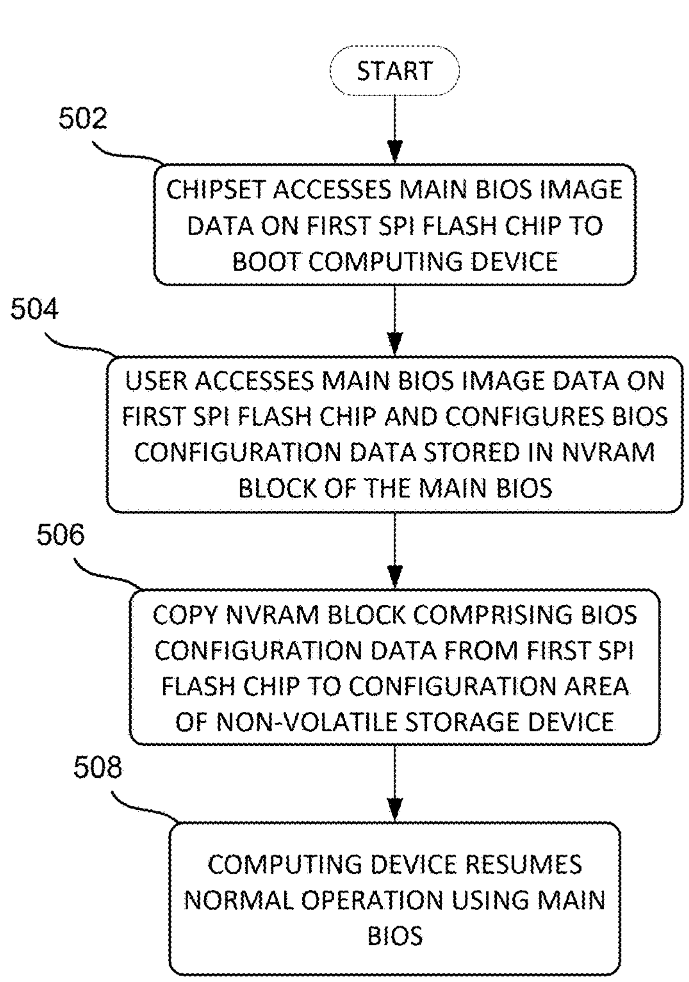
FIG. 5A is a flow diagram showing aspects of a routine for preserving BIOS configuration data in an embedded computing device.
Figure 5B:
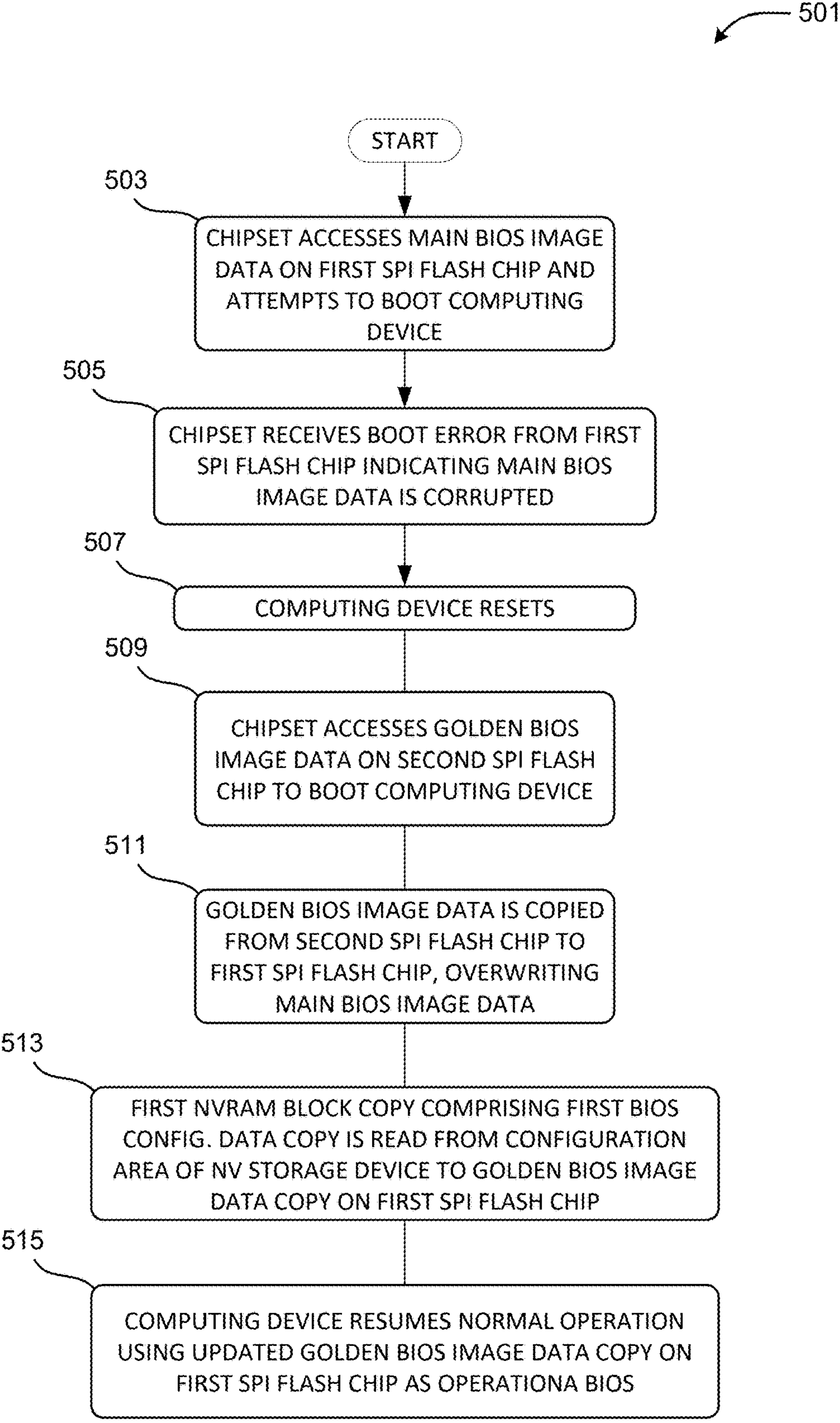
FIG. 5B is a flow diagram showing aspects of a routine for preserving BIOS configuration data in an embedded computing device.

FIGS. 5A and 5B are flow diagrams illustrating aspects of routines 500 and 501 for preserving BIOS configuration data in an embedded computing device, according to one or more embodiments presented herein.

In FIG. 5A, the routine 500 begins at operation 502, where the chipset 107 accesses the Main BIOS image data 101 on the first SPI flash chip 105 to boot the computing device 100. The routine proceeds to operation 504 where a user accesses the Main BIOS image data 101 on the first SPI flash chip 105 and configures the BIOS configuration data 103 stored in the NVRAM block 112 of the Main BIOS image data 101. The routine then proceeds to operation 506 where the NVRAM block 112 comprising the BIOS configuration data 103 is copied from the Main BIOS image 101 on the first SPI flash chip 105 to the configuration area 124 of the non-volatile storage device 104. The routine then concludes at operation 508 where the computing device 101 resumes normal operation using the Main BIOS image data 101 on the first SPI flash chip 105 as the operational BIOS.

In FIG. 5B, the routine 501 begins at operation 503 where the chipset 107 accesses the Main BIOS image data 101 on the first SPI flash chip 105 and attempts to boot the computing device 100. The routine proceeds to operation 505, where the chipset 107 receives a boot error message from the first SPI flash chip indicating the Main BIOS image data is corrupted. The routine then proceeds to operation 507, where the computing device 100 resets. After the reset, the routine proceeds to operation 509, where the chipset 107 accesses the Golden BIOS image data 102 stored on the second SPI flash chip 106 to boot the computing device 100. The routine then proceeds to operation 511 where the Golden BIOS image data 102 is copied from the second SPI flash chip 106 to the first SPI flash chip 105, overwriting the Main BIOS image data 101 with a Golden BIOS image data copy 114. Next, the routine proceeds to operation 513, where the first NVRAM block copy 122 that was generated in operation 506 of routine 500 is read from the configuration area 124 of the non-volatile storage device 104 to the Golden BIOS image data copy 114 stored on the first SPI flash chip 105. The first NVRAM block copy 122 comprises a first BIOS configuration data copy. The routine 501 concludes at operation 515, where the computing device 100 resumes normal operation using the updated Golden BIOS image data copy 114 on the first SPI flash chip 105 as the operational BIOS.

Figure 6:
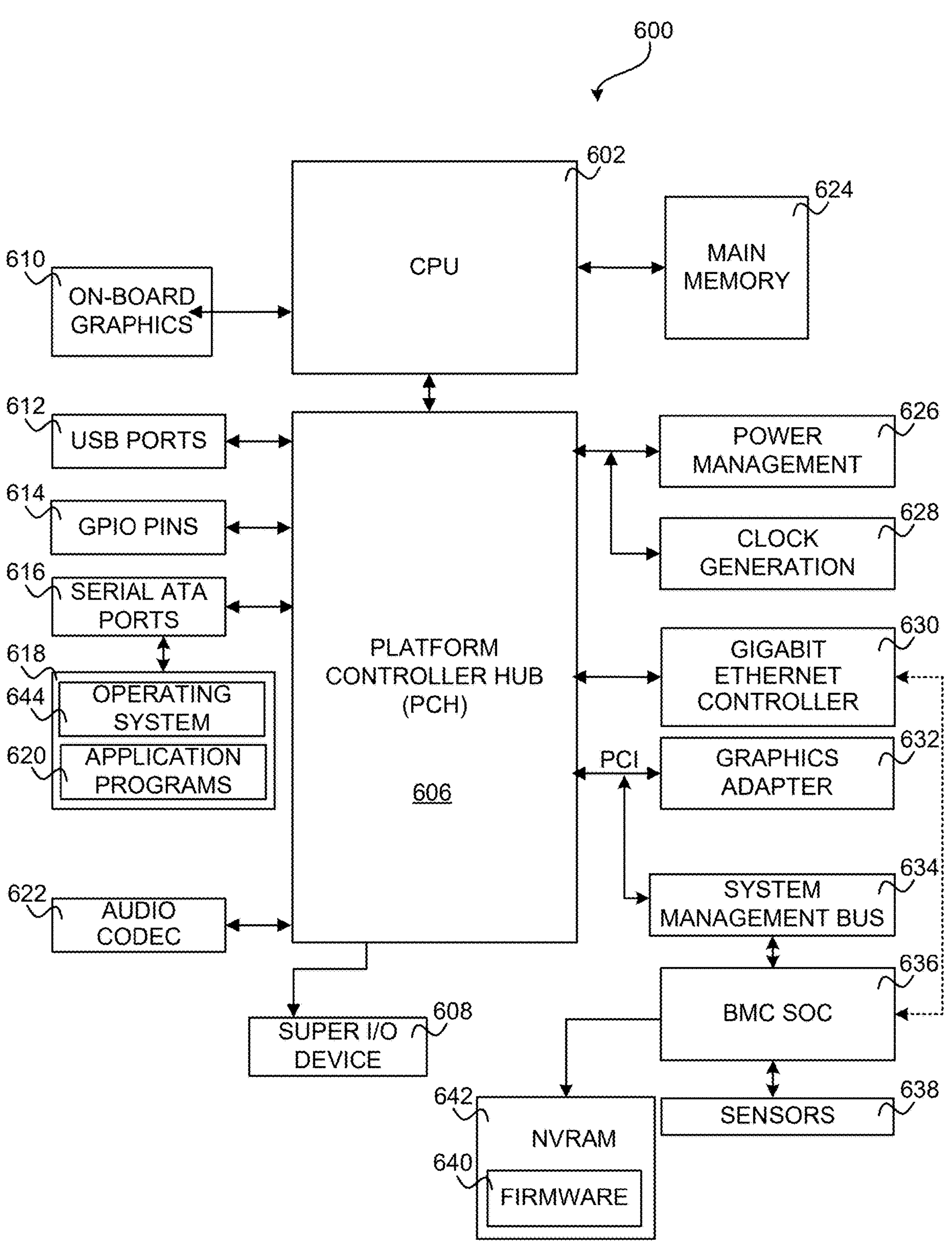
FIG. 6 is a computer architecture diagram that shows an illustrative architecture for a computer that can implement the technologies disclosed herein.

FIG. 6 and the following discussion are intended to provide a brief, general description of a suitable computing environment in which the configurations described herein can be implemented. In addition to the components shown in previous figures, any of the configurations described herein can also include some or all of the components shown in FIG. 6. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can be utilized as a computing device 100 in the implementations described herein. The illustrative computer architecture shown in FIG. 6 includes a baseboard, or "motherboard", which is a printed circuit board to which a multitude of components or devices can be connected by way of a system bus or other electrical communication path.

In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a random access memory ("RAM") used as the main memory 624 in the computing device 600 and, possibly, to an on-board graphics adapter 610. The PCH 606 provides an interface between the CPU 602 and the remainder of the computing device 100.

The PCH 606 can also be responsible for controlling many of the input/output functions of the computer 600. In particular, the PCH 606 can provide one or more universal serial bus ("USB") ports 612, an audio codec 622, a Gigabit Ethernet Controller 632, and one or more general purpose input/output ("GPIO") pins 614. The USB ports 612 can include USB 2.0 ports, USB 3.0 ports and USB 3.1 ports among other USB ports. The audio codec 622 can include Intel High Definition Audio, Audio Codec '97 ("AC '97") and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to one configuration, the PCH 606 includes a serial advanced technology attachment ("SATA") adapter for providing one or more serial ATA ports 616. The serial ATA ports 616 can be connected to one or more mass storage devices storing an OS, such as OS 644 and application programs 620, such as a SATA disk drive 618. As known to those skilled in the art, an OS 644 comprises a set of programs that control operations of a computer and allocation of resources. An application program is software that runs on top of the operating system 644, or other runtime environment, and uses computer resources to perform application specific tasks desired by the user.

According to one configuration, the OS 644 comprises the LINUX operating system. According to another configuration, the OS 644 comprises the WINDOWS operating system from MICROSOFT CORPORATION. According to another configuration, the OS 644 comprises the UNIX operating system or one of its variants. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 600.

As utilized herein, data processing unit(s), such as 602, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 104, 105, 106, and 201, may store instructions executable by data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device 100, while in some examples one or more of a CPU, GPU, and/or accelerator is external to a computing device 100.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports.

It should be appreciated that the program modules disclosed herein can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to, the technology used to implement the storage media, whether the storage media are characterized as primary or secondary storage, and the like. For example, if the storage media are implemented as semiconductor-based memory, the program modules can transform the physical state of the semiconductor main memory and/or NVRAM. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 606 can include a system management bus 634. As discussed above, when utilized to implement the computing device 100, the system management bus 634 can include a BMC SOC 636. As discussed above, the BMC SOC 636 is a microcontroller that includes functionality for monitoring aspects of the operation of the computer 600.

It should be appreciated that the functionality provided by the computer 600 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 600 might not include all the components shown in FIG. 6, can include other components that are not explicitly shown in FIG. 6, or might utilize an architecture completely different than that shown in FIG. 6.

Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for preserving BIOS configuration data in a computing device, the method for execution on a computing device comprising a first memory device communicating with the computing device via a serial peripheral interface protocol, a second memory device communicating with the first memory device, and a third memory device communicating with the first memory device, the method comprising:

accessing the first memory device, wherein the first memory device is a flash memory storing Main BIOS image data for initializing hardware and starting an operating system of the computing device;

receiving from the first memory device a boot error indicating the computing device is unable to boot from the first memory device;

in response to receiving the boot error from the first memory device:

resetting the computing device, booting from the second memory device, wherein the second memory device is a write-once, read-only flash memory storing Golden BIOS image data that is inaccessible by a user, creating a copy of the Golden BIOS image data on the first memory device by copying the Golden BIOS image data from the second memory device to the first memory device, and creating a second copy of the BIOS configuration data on the first memory device by copying a first copy of the BIOS configuration data from the third memory device to the first memory device, making user BIOS configuration settings accessible for a subsequent reboot of the computing device.

2. The method of claim 1, wherein the second copy of the BIOS configuration data is integrated into the copy of the Golden BIOS image data stored on the first memory device.

3. The method of claim 1, further comprising:

in response to a second reboot, accessing the second copy of BIOS configuration data on the first memory device to control a BIOS operation including at least one of: accessing SMBIOS data, selecting a device boot order, and modifying network settings.

4. The method of claim 1, wherein the second memory device communicates with the first memory device via a first direct memory access connection.

5. The method of claim 1, wherein the third memory device communicates with the first memory device via a second direct memory access connection.

6. The method of claim 1, wherein the Golden BIOS image data is inaccessible by an external data interface.

7. A computing system for preserving BIOS configuration data in a computing device, comprising:

one or more processing units;

a first memory device communicating with the computing device via a serial peripheral interface protocol;

a second memory device communicating with the first memory device; and a third memory device communicating with the first memory device, wherein at least one of the first memory device, second memory device, or third memory device has computer instructions encoded thereon to cause the one or more processing units to:

access the first memory device, wherein the first memory device is a flash memory storing Main BIOS image data for initializing hardware and starting an operating system of the computing device;

receive from the first memory device a boot error indicating the computing device is unable to boot from the first memory device;

in response to receiving the boot error from the first memory device:

reset the computing device, boot from the second memory device, wherein the second memory device is a write-once, read-only flash memory storing Golden BIOS image data that is inaccessible by a user, create a copy of the Golden BIOS image data on the first memory device by copying the Golden BIOS image data from the second memory device to the first memory device, and create a second copy of the BIOS configuration data on the first memory device by copying a first copy of the BIOS configuration data from the third memory device to the first memory device, making user BIOS configuration settings accessible for a subsequent reboot of the computing device.

8. The system of claim 7, wherein the second copy of the BIOS configuration data is integrated into the copy of the Golden BIOS image data stored on the first memory device.

9. The system of claim 7, further comprising:

in response to a second reboot, causing the one or more processing units to access the second copy of BIOS configuration data on the first memory device to control at least one BIOS operation including: accessing SMBIOS data, selecting a device boot order, and modifying network settings.

10. The system of claim 7, wherein the second memory device communicates with the first memory device via a first direct memory access connection.

11. The system of claim 7, wherein the third memory device communicates with the first memory device via a second direct memory access connection.

12. The system of claim 7, wherein the Golden BIOS image data is inaccessible by a data interface.

13. One or more non-transitory computer readable media that include at least one of a first memory device, a second memory device, a third memory device, or a random access memory, wherein the first memory device is a memory device communicating with a computing device via a serial peripheral interface protocol, the second memory device is a memory device communicating with the first memory device, and the third memory device is a memory device communicating with the first memory device, wherein the computer readable media include instructions for causing the computing device to:

access the first memory device, wherein the first memory device is a flash memory storing Main BIOS image data for initializing hardware and starting an operating system of the computing device;

receive from the first memory device a boot error indicating the computing device is unable to boot from the first memory device;

in response to receiving the boot error from the first memory device:

reset the computing device, boot from the second memory device, wherein the second memory device is a write-once, read-only flash memory storing Golden BIOS image data that is inaccessible by a user, create a copy of the Golden BIOS image data on the first memory device by copying the Golden BIOS image data from the second memory device to the first memory device, and create a second copy of the BIOS configuration data on the first memory device by copying a first copy of the BIOS configuration data from the third memory device to the first memory device, making user BIOS configuration settings accessible for a subsequent reboot of the computing device.

14. The one or more non-transitory computer readable media of claim 13, wherein the second copy of the BIOS configuration data is integrated into the copy of the Golden BIOS image data stored on the first memory device.

15. The one or more non-transitory computer readable media of claim 13, wherein the instructions further cause the computing device to, in response to a second reboot, access the second copy of BIOS configuration data on the first memory device to control at least one BIOS operation including: accessing SMBIOS data, selecting a device boot order, and modifying network settings.

16. The one or more non-transitory computer readable media of claim 13, wherein the second memory device communicates with the first memory device via a first direct memory access connection.

17. The one or more non-transitory computer readable media of claim 13, wherein the third memory device communicates with the first memory device via a second direct memory access connection.

18. The one or more non-transitory computer readable media of claim 13, wherein the Golden BIOS image data is inaccessible by a data interface.

* * * * *